(12) United States Patent
Hashimoto et al.

(10) Patent No.: US 10,507,942 B2
(45) Date of Patent: Dec. 17, 2019

(54) FORM-FILL-SEAL MACHINE AND BAG-MAKING PACKAGING MACHINE

(71) Applicant: ISHIDA CO., LTD., Kyoto-shi, Kyoto (JP)

(72) Inventors: Satoshi Hashimoto, Ritto (JP); Makoto Ichikawa, Ritto (JP); Takahiro Yasuda, Rittio (JP); Shinji Koike, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 501 days.

(21) Appl. No.: 15/037,126

(22) PCT Filed: Oct. 15, 2014

(86) PCT No.: PCT/JP2014/077467
§ 371 (c)(1),
(2) Date: May 17, 2016

(87) PCT Pub. No.: WO2015/083445
PCT Pub. Date: Jun. 11, 2015

(65) Prior Publication Data
US 2016/0297554 A1    Oct. 13, 2016

(30) Foreign Application Priority Data

Dec. 3, 2013  (JP) .................................. 2013-250298

(51) Int. Cl.
*B65B 9/20*    (2012.01)
*B65B 31/00*    (2006.01)
(Continued)

(52) U.S. Cl.
CPC .............. *B65B 9/20* (2013.01); *B65B 9/2007* (2013.01); *B65B 9/2028* (2013.01);
(Continued)

(58) Field of Classification Search
CPC ....... B65B 9/20; B65B 9/2007; B65B 9/2028; B65B 9/2049; B65B 31/00; B65B 51/26;
(Continued)

(56) References Cited

U.S. PATENT DOCUMENTS 2,915,866 A * 12/1959 Bartlo ................. B29C 66/1122
53/526
2,956,383 A * 10/1960 Gausman .................. B65B 1/24
53/526

(Continued)

FOREIGN PATENT DOCUMENTS

EP    0165819 A2    12/1985
EP    0381400 A2    8/1990
(Continued)

OTHER PUBLICATIONS

Information Statement by Third Party of the corresponding Japanese Application No. 2013-250298, dated Nov. 6, 2017.
(Continued)

*Primary Examiner* — Nathaniel C Chukwurah
*Assistant Examiner* — Lucas E. A. Palmer
(74) *Attorney, Agent, or Firm* — Global IP Counselors, LLP

(57) ABSTRACT

A form-fill-seal machine is configured to adjust for changes in the thickness of bags within a short time, and is provided with seal jaws, gas removal members, an air cylinder, and a control unit. The seal jaws transverse-seal a cylindrical film in a widthwise direction forming a bag. The gas removal members come into contact against the bag prior to transverse sealing of an upper edge part, discharging a gas upward from the bag. The air cylinder moves the gas removal members, switching the position of the gas removal members between a first position and a second position with respect to the seal jaws. The control unit, in a time slot just (Continued)

prior to the start of a transverse sealing action performed by the seal jaws, changes the timing of switching between the first position and the second position, and adjusts the amount of gas discharged from the bag.

8 Claims, 16 Drawing Sheets

(51) Int. Cl.
| | |
|---|---|
| B65B 51/26 | (2006.01) |
| B65B 57/02 | (2006.01) |
| B65B 63/02 | (2006.01) |
| B65B 51/30 | (2006.01) |
| B65B 57/00 | (2006.01) |
| B29C 65/18 | (2006.01) |
| B29L 31/00 | (2006.01) |
| B29C 65/00 | (2006.01) |
| B29C 65/30 | (2006.01) |

(52) U.S. Cl.
CPC ............ *B65B 9/2049* (2013.01); *B65B 31/00* (2013.01); *B65B 51/26* (2013.01); *B65B 51/303* (2013.01); *B65B 57/00* (2013.01); *B65B 57/02* (2013.01); *B65B 63/02* (2013.01); *B29C 65/18* (2013.01); *B29C 65/305* (2013.01); *B29C 66/1122* (2013.01); *B29C 66/4312* (2013.01); *B29C 66/4322* (2013.01); *B29C 66/49* (2013.01); *B29C 66/81422* (2013.01); *B29C 66/8221* (2013.01); *B29C 66/8223* (2013.01); *B29C 66/8226* (2013.01); *B29C 66/83241* (2013.01); *B29C 66/8491* (2013.01); *B29L 2031/7128* (2013.01)

(58) Field of Classification Search
CPC ....... B65B 51/303; B65B 57/00; B65B 57/02; B65B 63/02; B29C 65/18; B29C 65/305; B29C 66/1122; B29C 66/4312; B29C 66/4322; B29C 66/49; B29C 66/81422; B29C 66/8221; B29C 66/8223; B29C 66/8226; B29C 66/83241; B29C 66/8491; B29C 66/66; B29L 2031/7128
USPC .......................................................... 53/511
See application file for complete search history.

(56) References Cited

U.S. PATENT DOCUMENTS

| | | | | | |
|---|---|---|---|---|---|
| 2,960,808 | A | * | 11/1960 | Pike .................... | B65B 9/213 53/428 |
| 3,027,695 | A | * | 4/1962 | Leasure ............... | B65B 9/213 493/302 |
| 3,256,673 | A | * | 6/1966 | Tew ..................... | B65B 9/2042 53/551 |
| 3,545,983 | A | * | 12/1970 | Woods ................. | B65B 31/022 426/395 |
| 4,348,851 | A | * | 9/1982 | Prakken .............. | B29C 65/7451 53/507 |
| 4,563,862 | A | * | 1/1986 | McElvy .............. | B29C 66/8491 53/511 |
| 4,757,668 | A | * | 7/1988 | Klinkel ................ | B29C 65/02 53/374.6 |
| 4,924,656 | A | * | 5/1990 | Kovacs ................ | B65B 9/2042 53/170 |
| 4,947,618 | A | * | 8/1990 | Schneider ............. | B29C 65/18 156/583.1 |
| 4,947,621 | A | * | 8/1990 | Christine .............. | B65B 9/20 493/193 |
| 4,964,259 | A | * | 10/1990 | Ylvisaker ............ | B65B 9/073 53/374.8 |
| 5,014,493 | A | * | 5/1991 | West .................... | B65B 9/2042 53/128.1 |
| 5,031,386 | A | * | 7/1991 | Schneider ............ | B29C 65/18 53/370.7 |
| 5,203,145 | A | * | 4/1993 | Kammler .............. | B65B 9/207 53/552 |
| 5,251,422 | A | * | 10/1993 | Goodman ............. | B65B 5/061 53/251 |
| 5,881,539 | A | * | 3/1999 | Fukuda ................. | B65B 9/213 53/374.5 |
| 5,937,614 | A | * | 8/1999 | Watkins ............... | B29C 65/745 53/374.8 |
| 6,052,971 | A | * | 4/2000 | Malsam ................ | B65B 51/303 53/451 |
| 6,138,442 | A | * | 10/2000 | Howard ................ | B65B 51/30 53/373.7 |
| 6,519,922 | B1 | * | 2/2003 | Matheyka ............. | B65B 51/30 53/374.8 |
| 6,543,205 | B1 | * | 4/2003 | Faskhoody ........... | B65B 51/30 53/371.5 |
| 6,581,360 | B1 | * | 6/2003 | Hirsh ................... | B65B 51/306 53/551 |
| 6,729,113 | B2 | * | 5/2004 | Miyamoto ............ | B65B 51/306 53/374.5 |
| 6,881,287 | B2 | | 4/2005 | Yasuhira | |
| 7,159,376 | B2 | * | 1/2007 | Taylor .................. | B65B 51/306 53/374.9 |
| 7,448,188 | B2 | * | 11/2008 | Hauers ................. | B65B 9/2028 53/371.6 |
| 8,402,724 | B2 | * | 3/2013 | Cecil .................... | B29C 65/02 53/374.6 |
| 2003/0213217 | A1 | * | 11/2003 | Kondo .................. | B29C 65/18 53/545 |
| 2004/0093830 | A1 | * | 5/2004 | Miyazaki .............. | B65B 61/26 53/131.4 |
| 2004/0200189 | A1 | * | 10/2004 | Ricci .................... | B43M 3/04 53/202 |
| 2005/0155331 | A1 | | 7/2005 | Matheyka et al. | |
| 2009/0288370 | A1 | * | 11/2009 | Ours .................... | B65B 1/28 53/434 |
| 2010/0101188 | A1 | * | 4/2010 | Koike ................... | B65B 9/2028 53/450 |
| 2010/0215813 | A1 | * | 8/2010 | Peterson .............. | B65B 9/2007 426/106 |
| 2010/0276450 | A1 | * | 11/2010 | Fergusson ............ | B65B 9/213 222/105 |
| 2010/0281832 | A1 | * | 11/2010 | Monti ................... | B29C 65/02 53/451 |
| 2012/0204514 | A1 | * | 8/2012 | Miyamoto ............ | B65B 1/22 53/235 |
| 2012/0204515 | A1 | * | 8/2012 | Miyamoto ............ | B65B 1/22 53/266.1 |

FOREIGN PATENT DOCUMENTS

| | | |
|---|---|---|
| EP | 1538082 A1 | 6/2005 |
| EP | 2311735 A1 | 4/2011 |
| JP | 46-25116 B | 7/1971 |
| JP | 64-023906 A | 1/1989 |
| JP | 64-9209 B2 | 2/1989 |
| JP | 64-058610 A | 3/1989 |
| JP | 05-065144 A | 3/1993 |
| JP | 09-124002 A | 5/1997 |
| JP | 09-207246 A | 8/1997 |
| JP | 11-171110 A | 6/1999 |
| JP | 2003-212223 A | 7/2003 |

OTHER PUBLICATIONS

Examination Report of the corresponding European Application No. 14867007.8, dated Dec. 7, 2017.
Translation of the Written Opinion of the International Searching Authority, dated Jun. 7, 2016.
Extended European Search Report of the corresponding European Application No. 14867007.8, dated Nov. 9, 2016.

(56) References Cited

OTHER PUBLICATIONS

Office Action of the corresponding European Patent Application No. 14867007.8, dated Jul. 3, 2017.
Examination Report of the corresponding Indian Patent Application No. 201647021896, dated Aug. 26, 2019.

* cited by examiner

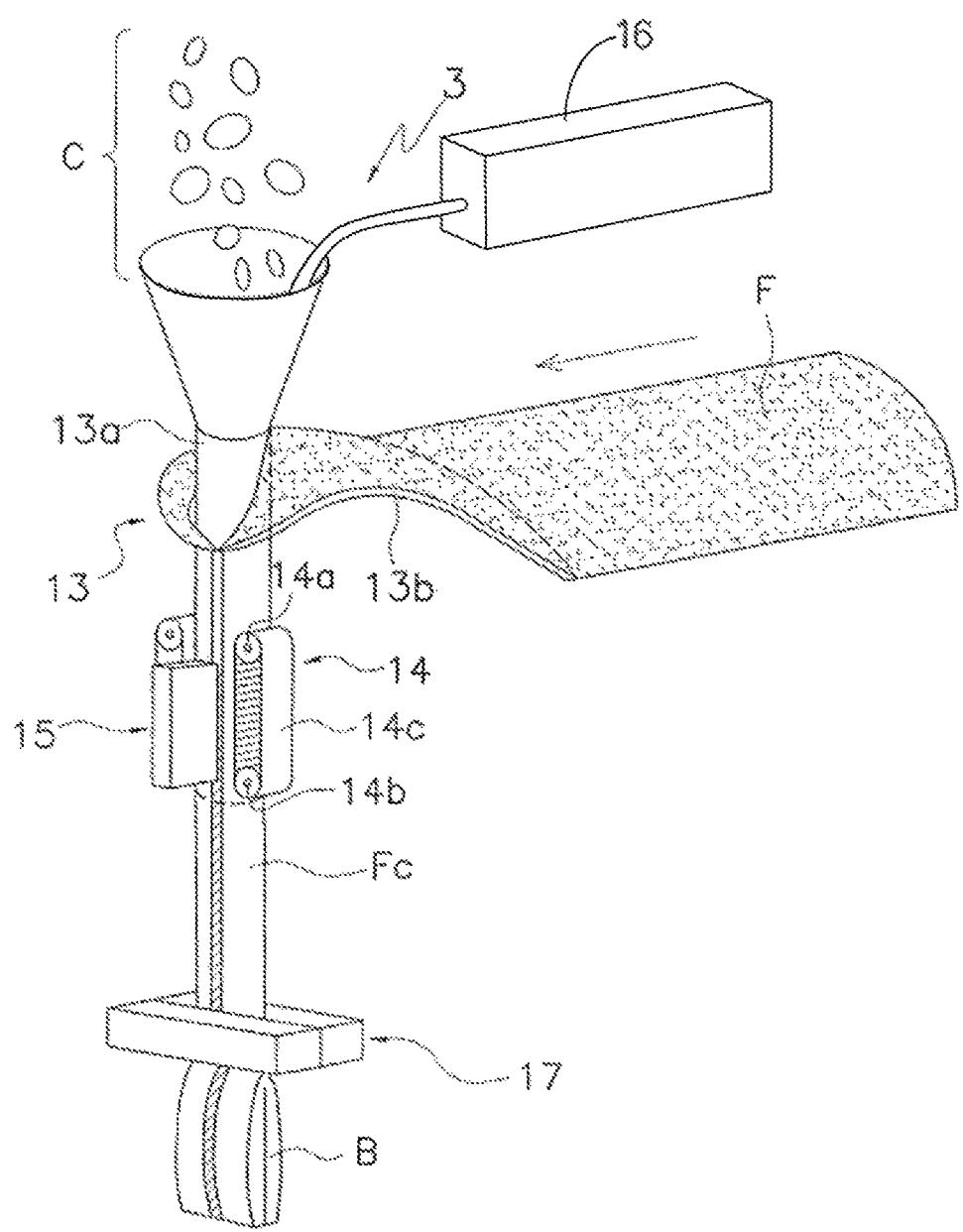
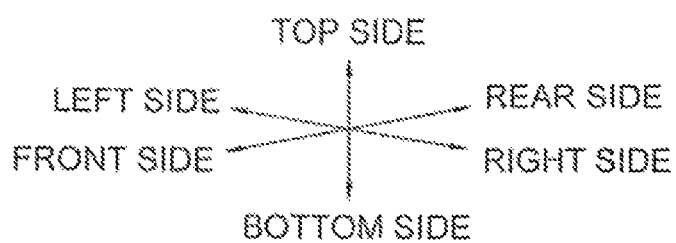
FIG. 2

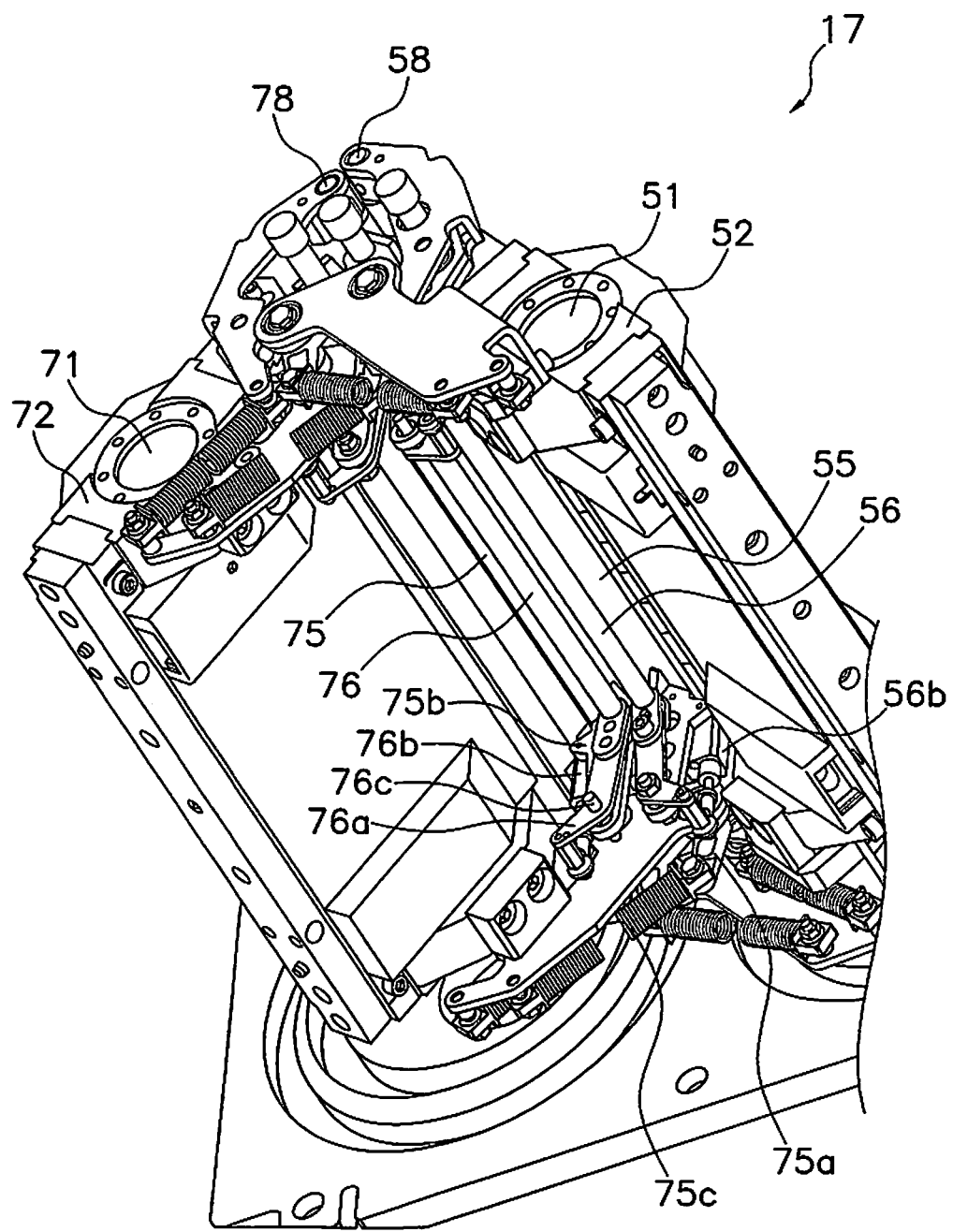
F I G. 4

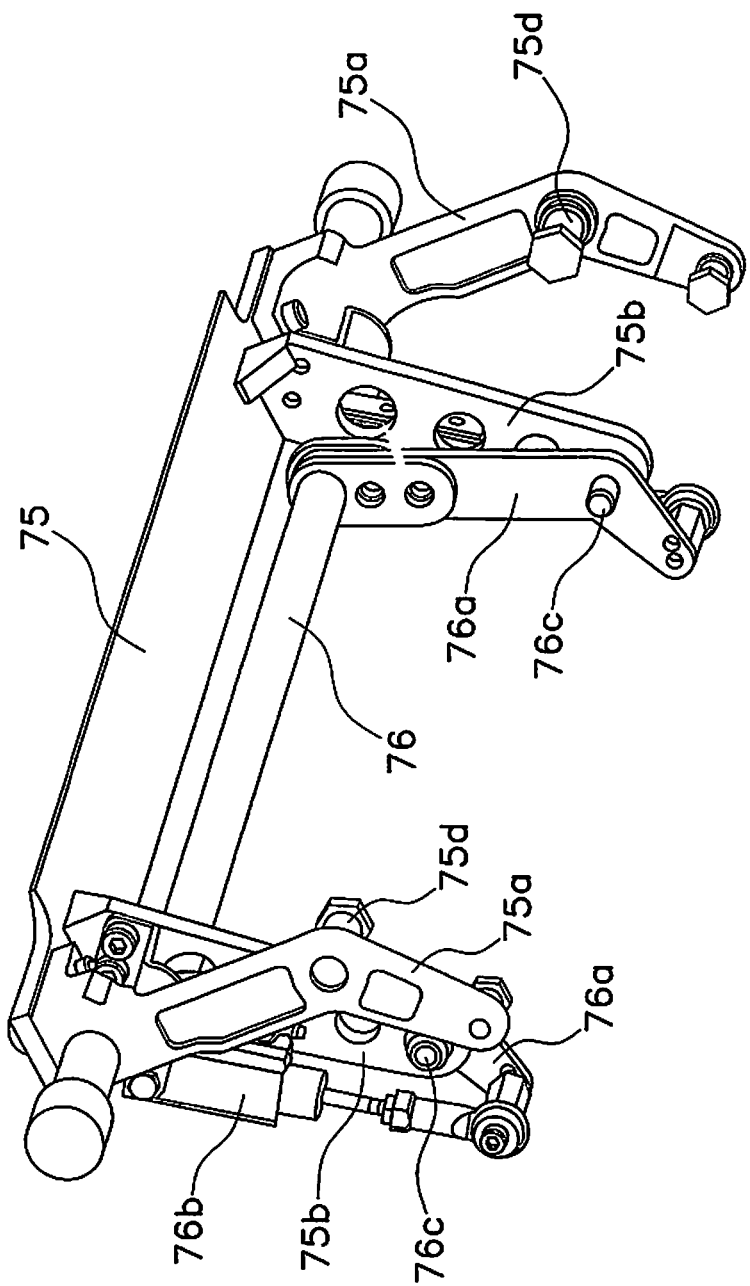
F I G. 5

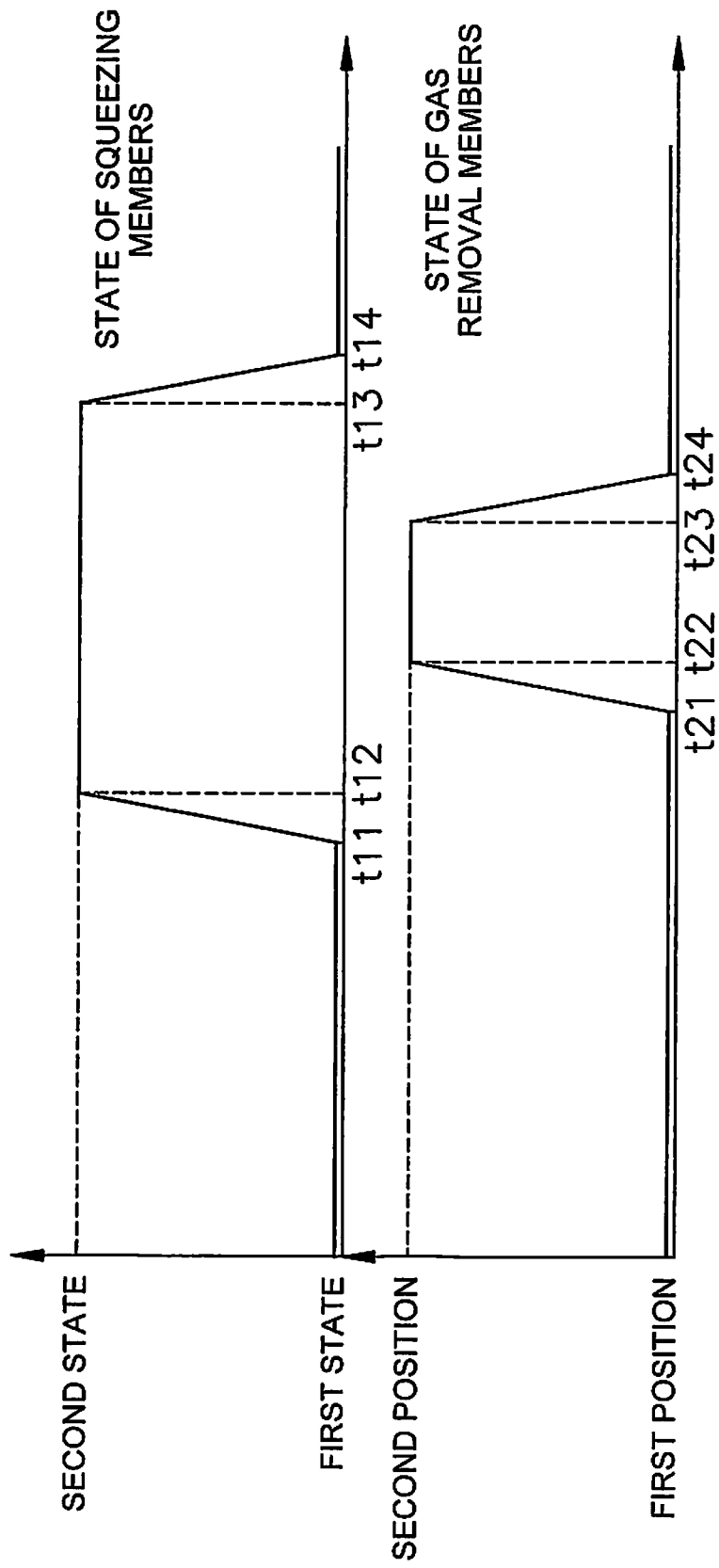
F I G. 14

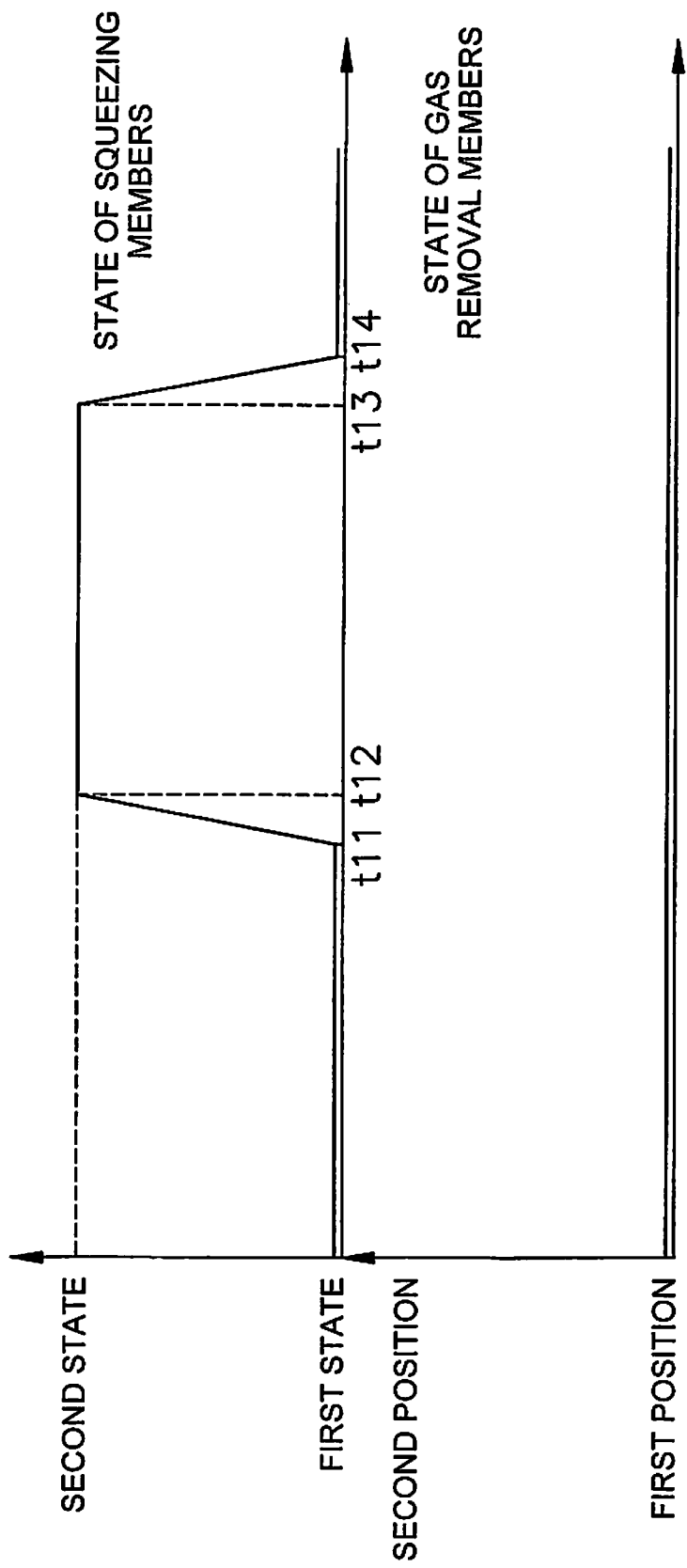
F I G. 1 6

FORM-FILL-SEAL MACHINE AND BAG-MAKING PACKAGING MACHINE

CROSS-REFERENCE TO RELATED APPLICATIONS

This U.S. National stage application of PCT/JP2014/077467 claims priority under 35 U.S.C. § 119(a) to Japanese Patent Application No. 2013-250298, filed in Japan on Dec. 3, 2013, the entire content of which is hereby incorporated herein by reference.

TECHNICAL FIELD

The present invention relates to a form-fill-seal machine and a form-fill-seal system.

BACKGROUND ART

Vertical bag form-fill-seal machines are an example of a form-fill-seal machine in which, conventionally, a bag that, while being formed, is filled with package contents such as food products, and hermetically sealed to package the contents. A bag form-fill-seal machine shapes a packaging material that is a film of sheet form into a cylindrical shape (tube shape) using a former and a tube, and seals the overlapping vertical edges of the tube-shaped packaging material with a longitudinal sealing mechanism. The interior of the tube-shaped packaging material is then filled with package contents, the top part of the bag and the bottom part of the bag are sealed by a transverse sealing mechanism, and then the transverse-sealed portions are cut across the center by a cutter. In a pillow form-fill-seal machine, the aforedescribed actions of forming bags and filling the bags with package contents are carried out continuously in alternating fashion.

SUMMARY OF THE INVENTION

Technical Problem

The bags hermetically seated upon being filled with the package contents are then boxed and shipped. However, when large amounts of gas are sealed within the bags, only a given number of bags can be accommodated within a box, and when small amounts of gas are sealed within the bags, the packages move around inside the box. For this reason, each time that the form-fill-seal machine is operated, it has been necessary for the operator to control the amount of gas sealed within the bags, so as to adjust their thickness. Japanese Laid-open Patent Application No. H05-65144 discloses a form-fill-seal machine provided with a mechanism designed to avoid excess air from entering the sealed bags, in order to adjust the thickness of the bags.

As another mechanism for adjusting the thickness of the bags, there are employed springs installed below the transverse sealing mechanism that apply force to the bags and cause air to escape therefrom. However, with this spring mechanism, each time that the bag thickness is adjusted, it is necessary for the operator to change the positions and/or number of the springs used when forming an empty bag; therefore, adjusting the bag thickness is time-consuming. Moreover, the ideal amount of air that should be sealed within the bags varies considerably with the type and/or specific gravity of the package contents with which the bags are filled, and it is also possible that the type and/or specific gravity of the package contents will change on a daily basis. For this reason, with this spring mechanism, it is exceedingly difficult to properly adjust the bag thickness as needed.

An object of the present invention is to provide a form-fill-seal machine and a form-fill-seal system, with means to adjust for changes in the thickness of bags within a short time.

Solution to Problem

The form-fill-seal machine according to the present invention fills and hermetically seals package contents in a tube-shaped packaging material. This form-fill-seal machine is provided with transverse sealing members, gas removal members, a movement mechanism, and a control mechanism. The transverse sealing members transverse-seal the packaging material in the widthwise direction and form a bag. The gas removal members are arranged below the transverse sealing member, and come into contact against the bag just prior to sealing of an upper edge part by the transverse sealing members, discharging a gas upwardly from the bag. The movement mechanism moves the gas removal members, switching the position of the gas removal members between at least a first position and a second position with respect to the transverse sealing members. The control mechanism, in a time slot just prior to the start of a transverse sealing action by the transverse sealing members, changes the timing of switching between the first position and the second position, and adjusts the amount of gas discharged from the bags.

Through control of the timing at which the position of the gas removal member is switched, this form-fill-seal machine can adjust with high accuracy the amount of gas discharged from the bags just prior to transverse sealing. Consequently, this form-fill-seal machine can easily adjust the thickness of the bags within a short time.

Preferably, the form-fill-seal machine according to the present invention is further provided with squeezing members. The squeezing members are arranged below the transverse sealing members, and come into contact with the bag just prior to transverse sealing by the transverse sealing members, squeezing the bag downward.

By using the squeezing members to squeeze the bags, this form-fill-seal machine can eliminate package contents inside transverse sealed sections of the bags. Consequently, the form-fill-seal machine can prevent transverse sealing defects.

Preferably, the control mechanism in the form-fill-seal machine according to the present invention, at a first switching time, switches the position of the gas removal members from the first position to the second position, increasing the amount of gas discharged from the bags; and at a second switching time, switches the position of the gas removal members from the second position to the first position, decreasing the amount of gas discharged from the bags. The control mechanism sets the first switching time to precede the second switching time, and sets the second switching time to precede the time at which the transverse sealing action performed by the transverse sealing member commences.

By switching the position of the gas removal member prior to the start of the transverse sealing action, discharging gas from the bags by the gas removal member can be reliably performed.

Preferably, the form-fill-seal machine according to the present invention is further provided with a gas infusion mechanism. The gas infusion mechanism infuses the interior of the bag with a gas just prior to transverse sealing by the transverse sealing members.

With this form-fill-seal machine, in cases in which a sufficient amount of gas has not entered the bag prior to the start of transverse sealing, gas can be injected into the bag to properly adjust the thickness of the sealed bag.

Preferably, in the form-fill-seal machine according to the present invention, the movement mechanism has actuators for adjusting the position of the gas removal members, and air cylinders as power supplies for the actuators. The control mechanism further changes the pressure of the air cylinders, and adjusts the amount of gas discharged from the bag.

With this form-fill-seal machine, by employing the actuator having the air cylinder as the power supply to move the gas removal member, the timing at which the position of the gas removal member is switched can be controlled with high accuracy.

The form-fill-seal system according to the present invention is provided with the form-fill-seal machine according to the present invention, and a thickness measurement mechanism. The thickness measurement mechanism measures the thickness of the bags hermetically sealed through transverse sealing by the transverse sealing members. The control mechanism of the form-fill-seal machine adjusts the amount of gas discharged from the bag, according to the bag thickness measured by the thickness measurement mechanism.

By changing the timing for switching the position of the gas removal member according to the thickness of the sealed bags, this form-fill-seal machine can automatically adjust the amount of gas discharged from the bags. Consequently, this form-fill-seal machine can appropriately be adjusted in order to accommodate differing thickness of the sealed bags.

The form-fill-seal machine according to the present invention fills and hermetically seals package contents into a tube-shaped packaging material. This form-fill-seal machine is provided with transverse sealing members, gas removal members, a movement mechanism, and a control mechanism. The transverse sealing members transverse-seal the packaging material in the widthwise direction, forming a bag. The gas removal members are arranged below the transverse sealing members, and come into contact against the bag just before an upper edge part is sealed by the transverse sealing members, causing gas to be discharged upwardly from the bag. The movement mechanism moves the gas removal members, changing the position of the gas removal members with respect to the transverse sealing members. The control mechanism, in a time slot just prior to the start of a transverse sealing action by the transverse sealing members, changes the position of the gas removal members, and adjusts the amount of gas discharged from the bag. The movement mechanism has actuators for adjusting the position of the gas removal members, and air cylinders as power supplies for the actuators. The control mechanism further changes the pressure of the air cylinders, and adjusts the amount of gas discharged from the bag.

Advantageous Effects of Invention

The form-fill-seal machine and the form-fill-seal system according to the present invention can easily adjust the thickness of bags within a short time.

BRIEF DESCRIPTION OF THE DRAWINGS

FIG. 2 is a perspective view showing a simplified configuration of a form-fill-seal unit;

FIG. 4 is a perspective view showing a transverse sealing mechanism viewed from the lower side;

FIG. 5 is a perspective view showing a linking part between a gas removal member and a squeezing member;

FIG. 14 is graphs showing timing of switching of the position of a gas removal member;

FIG. 16 is an example of graphs of timing of switching of the position of a gas removal member in the Modification A.

DESCRIPTION OF EMBODIMENTS

Figure 1:
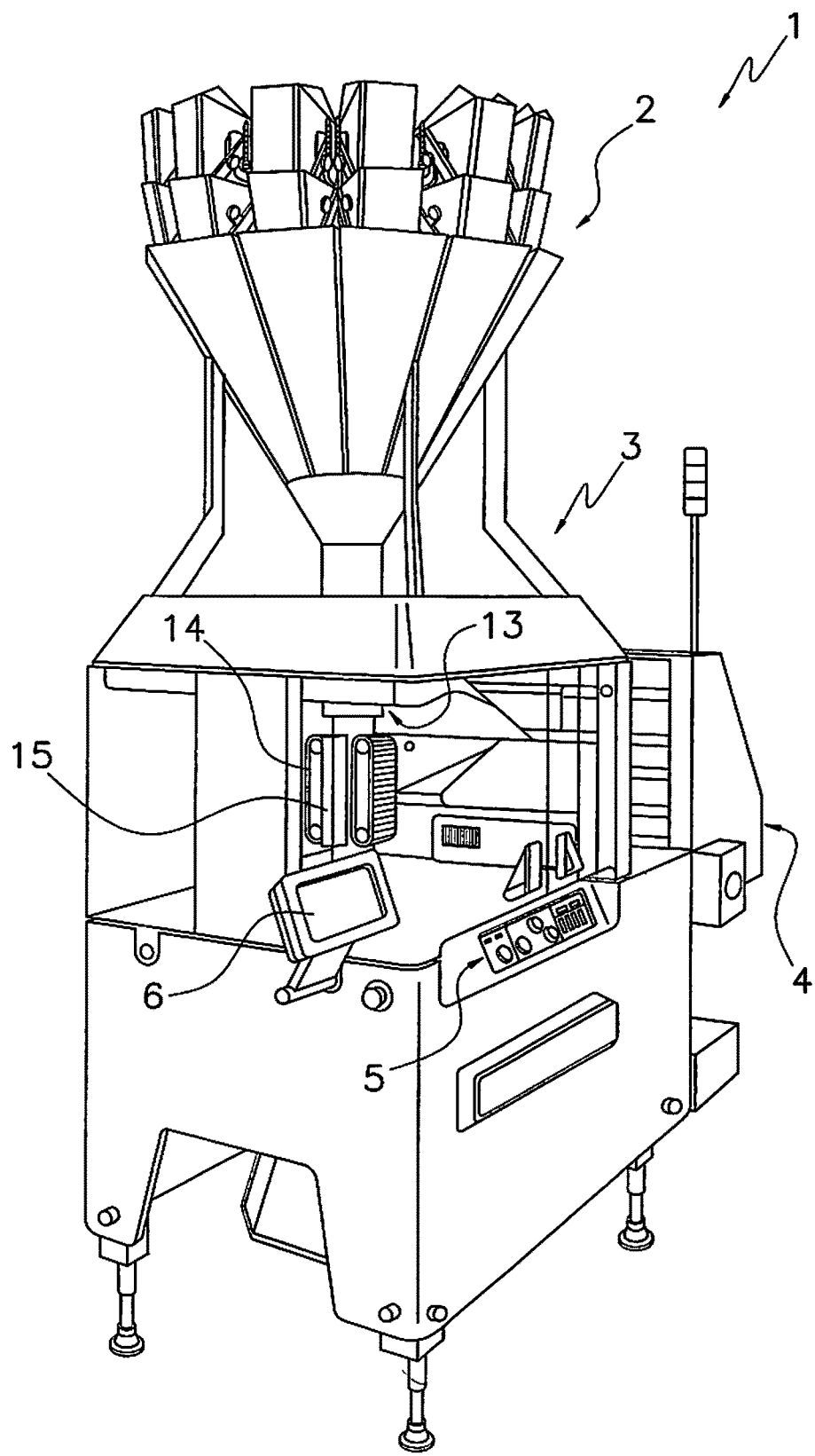
FIG. 1 is a perspective view of a form-fill-seal machine as an embodiment of the present invention.

The embodiment of the present invention will be described while referring to the drawings. The embodiment described below is one specific example of the present invention, and is not intended to limit the technical scope of the present invention.

(1) Configuration of Form-Fill-Seal Machine

FIG. 1 is a perspective view of a form-fill-seal machine 1 according to one embodiment of the present invention. The form-fill-seal machine 1 is a machine for bagging a food product or other package contents. The form-fill-seal machine 1 is configured mainly from a combination weighing unit 2, a form-fill-seal unit 3, and film supply unit 4.

The combination weighing unit 2 is arranged above the form-fill-seal unit 3. The combination weighing unit 2 weighs out into a plurality of weighing hoppers the weight of package contents, and combines the weights measured in each of the weighing hoppers, to arrive at a prescribed total weight. The combination weighing unit 2 then discharges the package contents, in the prescribed combined total weight, downward to supply the form-fill-seal unit 3.

At timing coincident with supply of the package contents from the combination weighing unit 2, the form-fill-seal unit 3 places the package contents into the bags, and seals the bags. The details of the configuration and operation of the form-fill-seal unit will be discussed below.

The film supply unit 4 is arranged adjacent to the form-fill-seal unit 3, and supplies the form-fill-seal unit 3 with packaging film for forming into bags. A film roll onto which the film is wound is installed in the film supply unit 4. The film is reeled out from the film roll by the film supply unit 4.

The form-fill-seal machine 1 is provided with an operation switch 5 and a liquid crystal display 6 that are mounted onto a front surface of the chassis. The liquid crystal display 6 is a touch panel display arranged at a location visible to the operator of the operation switch 5. The operation switch 5 and the liquid crystal display 6 function as input devices for receiving commands to the form-fill-seal machine 1, and settings relating to the form-fill-seal machine 1. The liquid crystal display 6 also functions as an output device for displaying information relating to the form-fill-seal machine 1.

The form-fill-seal machine 1 is provided with a control unit (not illustrated) housed within the chassis. The control unit is a computer configured from a CPU, ROM, RAM, and the like. The control unit is connected to the combination weighing unit 2, the form-fill-seal unit 3, the film supply unit 4, the operation switch 5, and the liquid crystal display 6. On the basis of input from the operation switch 5 and the liquid crystal display 6, the control unit controls the combination weighing unit 2, the form-fill-seal unit 3, and the film supply unit 4, and outputs information of various kinds to the liquid crystal display 6.

(2) Configuration of Form-Fill-Seal Unit

FIG. 2 is a perspective view showing a simplified configuration of the form-fill-seal unit 3. In the description below, the six directions "front (front surface)," "back (back surface)," "up," "down," "left," and "right" are defined as shown in FIG. 2.

The form-fill-seal unit 3 is configured mainly from a shaping mechanism 13, a pull-down belt mechanism 14, a longitudinal sealing mechanism 15, and a transverse sealing mechanism 17. The shaping mechanism 13 shapes a sheet-shaped film F, conveyed thereto from the film supply unit 4, into a tube shape. The pull-down belt mechanism 14 conveys the tube-shaped film F downward. The longitudinal sealing mechanism 15 seals, in a longitudinal direction parallel to the conveying direction, portions where both edges of the tube-shaped film F overlap, and forms a cylindrical film Fc. The transverse sealing mechanism 17 seals the cylindrical film Fc in a transverse direction orthogonal to the conveying direction, forming bags B which are sealed at their top edge portion and bottom edge portion.

(2-1) Shaping Mechanism

The shaping mechanism 13 has a tube 13*a* and a former 13*b*. The tube 13*a* is a round cylindrical member open at the top end and the bottom end. As shown in FIGS. 1 and 2, package contents C are basically dry products supplied from the combination weighing unit 2 and are charged into the opening at the top end of the tube 13*a*. The former 13*b* is arranged so as to encircle the tube 13*a*. As the film F reeled out from the film roll of the film supply unit 4 passes through a gap between the tube 13*a* and the former 13*b*, the film wraps about the tube 13*a* to form a tube shape. The tube 13*a* and the former 13*b* can be swapped out according to the size of the bags B being manufactured.

(2-2) Pull-Down Belt Mechanism

The pull-down belt mechanism 14 conveys downward the film F which has wrapped about the tube 13*a*, while holding the film under suction. The pull-down belt mechanism 14 has mainly a drive roller 14*a*, a follower roller 14*b*, and a pair of belts 14*c*. As shown in FIG. 2, the pair of belts 14*c* is arranged to both the left and right sides of the tube 13*a* so as to sandwich the tube 13*a*, and has a mechanism for holding under suction the tube-shaped film F. Through driving of the pair of belts 14*c* by the drive roller 14*a* and the follower roller 14*b*, the pull-down belt mechanism 14 conveys downward the tube-shaped film F.

(2-3) Longitudinal Sealing Mechanism

The longitudinal sealing mechanism 15 seals the tube-shaped film F in the longitudinal direction (the vertical direction in FIG. 2). The longitudinal sealing mechanism 15 is arranged on the front surface side of the tube 13*a*. A drive mechanism (not illustrated) moves the longitudinal sealing mechanism 15 in the front or back direction so as to approach or move away from the tube 13*a*.

By driving the longitudinal sealing mechanism 15 closer to the tube 13*a* using the drive mechanism, longitudinal-direction overlapping portions of the film F wrapped about the tube 13*a* are sandwiched between the longitudinal sealing mechanism 15 and the tube 13*a*. The overlapping portions of the film F are heated while being pressed against the tube 13*a* under fixed pressure by the drive mechanism, sealing the longitudinal-direction overlapping portions of the film F and forming a cylindrical film Fc. The longitudinal sealing mechanism 15 has a heater for heating the overlapping portions of the film F, a heater belt that contacts the overlapping portions of the film F, and the like.

(2-4) Transverse Sealing Mechanism

Figure 3:
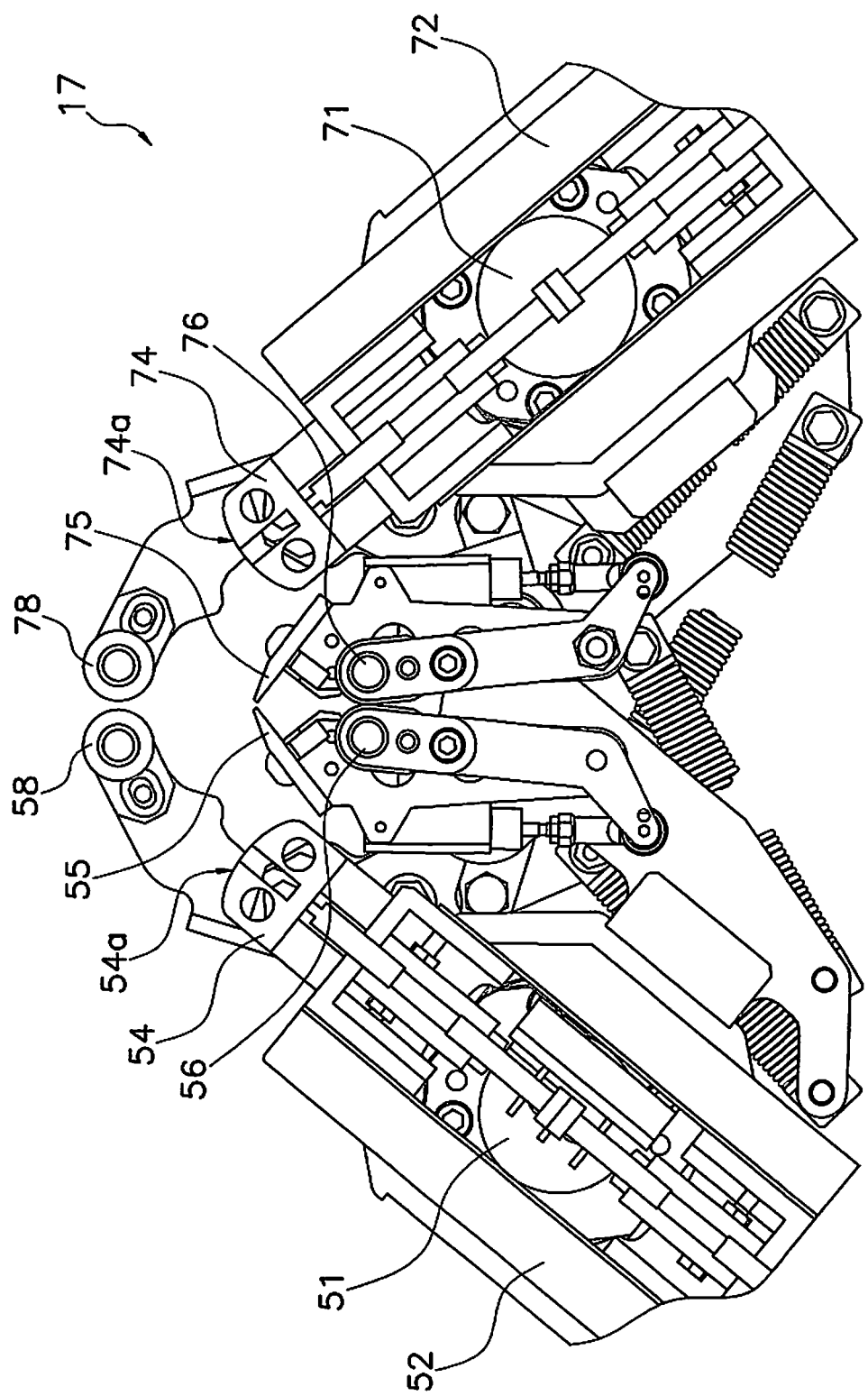
FIG. 3 is a side view showing a transverse sealing mechanism viewed from the right side.

The transverse sealing mechanism 17 seals the cylindrical film Fc in the transverse direction (the left-right direction in FIG. 2). The transverse sealing mechanism 17 is arranged below the shaping mechanism 13, the pull-down belt mechanism 14, and the longitudinal sealing mechanism 15. FIG. 3 is a side view of the transverse sealing mechanism 17, seen from the right side in FIG. 2. In FIG. 3, a direction perpendicular to the plane of the drawing is the left-right direction.

The transverse sealing mechanism 17 is configured mainly from a pair of rotating shafts 51, 71, a pair of arm members 52, 72, a pair of seal jaws 54, 74, a pair of squeezing members 55, 75, a pair of gas removal members 56, 76, a pair of clamp rollers 58, 78, and a rotating shaft horizontal movement mechanism 17*a*. These pairs of members are arranged to both the front and rear sides of the cylindrical film Fc.

(2-4-1) Rotating Shafts

The rotating shafts 51, 71 are arranged extending in the direction perpendicular to the plane of the drawing in FIG. 3. The rotating shafts 51, 71, in proximity to both lengthwise ends thereof, are linked respectively to the arm members 52, 72 and are incapable of relative rotation therewith. The rotating shafts 51, 71 are arranged to both the front and rear sides of the tubular film Fc and rotate synchronously in mutually opposite directions (the directions of dot-and-dash line arrows shown in FIG. 3). The rotating shaft 51 is arranged to the front side of the tubular film Fc, and rotates clockwise, when the transverse sealing mechanism 17 is viewed from the right. The rotating shaft 71 is arranged to the rear side of the tubular film Fc, and rotates counterclockwise, when the transverse sealing mechanism 17 is viewed from the right.

The one ends of the rotating shafts 51 and 71 respectively pass through cams 57, 77 and moving plates 160*a*, 160*b*, discussed later (see FIG. 7), and linked via Schmidt couplings to a rotating drive mechanism (not illustrated) such as a motor or the like. The other ends of the rotating shafts 51 and 71 respectively pass through opposite-side cams 57, 77 and moving plates 160*a*, 160*b*, and protrude out therefrom. The protruding portions of the other ends of the rotating shafts 51, 71 are respectively provided with slip rings (not illustrated), for supplying power to a heater of the seal jaws 54, 74 and the like.

The rotating shafts 51, 71, the cams 57, 77, and the moving plates 160*a*, 160*b* are linked in such a way as to be capable of relative rotation, but incapable of relative rotation in a horizontal direction orthogonal to the rotating shafts 51, 71. For this reason, the rotating shafts 51, 71, the cams 57, 77, and the moving plates 160*a*, 160*b* move in unison with respect to the horizontal direction orthogonal to the rotating shafts 51, 71.

The Schmidt couplings are configured from three disks connected to one another, and constitute shaft couplings for transmitting rotation of an input shaft, i.e., the rotating drive mechanism, to output shafts, i.e., the rotating shafts 51, 71. The Schmidt couplings can transmit rotation of the input shaft to the rotating shafts 51, 71 even in cases in which the rotating shafts 51, 71 move in planar fashion with respect to the input shaft which is fixed in planar fashion, so that the distance between their axial centers changes.

(2-4-2) Arm Members

The arm members 52, 72 are fixed, respectively, to the rotating shafts 51, 71 in proximity to both lengthwise ends of the rotating shafts 51, 71, so as to be incapable of relative rotation with respect thereto. The arm members 52, 72 are block-shaped members that are elongated in one direction and rotate respectively together with the rotating shafts 51, 71. The arm members 52, 72 are arranged to the inside of the cams 57, 77, and to the outside of the seal jaws 54, 74, respectively, of the in the front-back direction.

(2-4-3) Seal Jaws

The seal jaws 54, 74 are arranged extending in a direction perpendicular to the plane of the drawing in FIG. 3. The length of the seal jaws 54, 74 in the left-right direction is greater than the width of the tubular film Fc. The seal jaws 54, 74 have internal heaters (not illustrated). The heaters of the seal jaws 54, 74 heat sealing surfaces 54*a*, 74*a* of the seal jaws 54, 74. The sealing surfaces 54*a*, 74*a* contact one another during transverse sealing of the cylindrical film Fc. In so doing, the cylindrical film Fc sandwiched between the seal jaws 54, 74 is heat-sealed in the transverse direction.

(2-4-4) Squeezing Members

The squeezing members 55, 75 are plates including an elastic material, arranged extending in a direction perpendicular to the plane of the drawing in FIG. 3. The squeezing members 55, 75 are arranged to the front of the seal jaws 54, 74, and to the back of the gas removal members 56, 76, discussed later, in the direction of rotation of the rotating shafts 51, 71 shown by the dot-and-dash line arrows in FIG. 3. That is, the squeezing members 55, 75 are respectively arranged between the seal jaws 54, 74 and the gas removal members 56, 76, in the direction of rotation of the rotating shafts 51, 71. As discussed below, the squeezing members 55, 75 are linked respectively to the gas removal members 56, 76.

At a point in time just prior to sealing of the cylindrical film Fc by the seal jaws 54, 74, the squeezing members 55, 75 come into contact with the cylindrical film Fc before the seal jaws 54, 74 do. Then, with a slight gap open inside the cylindrical film Fc, the squeezing members 55, 75 move at a faster speed than the seal jaws 54, 74 in a direction shown by the dot-and-dash line arrows in FIG. 3, thereby squeezing the cylindrical film Fc in a downward direction. In so doing, the squeezing members 55, 75 forcibly cause the package contents C to descend inside the cylindrical film Fc, avoiding situations in which foreign matter such as the package contents C becomes enmeshed by the seal jaws 54, 74 in the transverse-sealed sections of the cylindrical film Fc. Consequently, the occurrence of sealing defects by the seal jaws 54, 74 can be minimized by the squeezing members 55, 75.

(2-4-5) Gas Removal Members

The gas removal members 56, 76 are pipes arranged extending in a direction perpendicular to the plane of the drawing in FIG. 3. The gas removal members 56, 76 are arranged to the front of the seal jaws 55, 75, in the direction of rotation of the rotating shafts 51, 71 shown by the dot-and-dash line arrows in FIG. 3.

FIG. 4 is a perspective view of the transverse sealing mechanism 17, viewed from the lower side; the squeezing members 55, 75, the gas removal members 56, 76, and the like are shown. The gas removal members 56, 76 are linked respectively to the squeezing members 55, 75.

FIG. 5 is a perspective view showing a linking part between the gas removal member 76 and the left-side squeezing member 75, shown in FIG. 4. The following description is applicable as well to the right-side gas removal member 56 and the right-side squeezing member 55 shown in FIG. 4. The squeezing member 75 is linked to a pair of outside levers 75*a* and to a pair of linking members 75*b*. The pair of outside levers 75*a* are linked to either end of the squeezing member 75. The pair of linking members 75*b* are linked to the squeezing member 75 in proximity to either end thereof, between the pair of outside levers 75*a*. The outside levers 75*a* are linked at one end to the squeezing member 75. The outside levers 75*a* are linked at the other end to springs 75*c* as shown in FIG. 4. Outside rotation shafts 75*d* pass through curved portions of the outside levers 75*a*. The outside levers 75*a* receive elastic force from the springs 75*c*, and rotate within a prescribed range centered on the outside rotation shafts 75*d*. The linking members 75*b* are linked at one end to the squeezing member 75. The linking members 75*b* are rotatably linked at the other end to inside levers 76*a*, discussed below.

The gas removal member 76 is linked to the pair of inside levers 76*a*. The pair of inside levers 76*a* are linked to either end of the gas removal member 76. The inside levers 76*a* are linked at one end to the gas removal member 76. The inside levers 76*a* are linked at the other end to air cylinders 76*b*. Inside rotation shafts 76*c* pass through curved portions of the inside levers 76*a*. The inside rotation shafts 76*c* pass through the ends of the linking members 75*b*. Therefore, the inside levers 76*a* are linked to the linking members 75*b* so as to be rotatable about the inside rotation shafts 76*c*. The inside levers 76*a* are rotated by adjusting the air pressure of the air cylinders 76*b*, to change the position of the gas removal member 76. That is, the air cylinders 76*b* function as power supplies for the actuators in order to change the position of the gas removal member 56. Likewise, the air cylinder 56*b* shown in FIG. 4 functions as a power supply for the actuator in order to change the position of the gas removal member 56.

Figure 6:
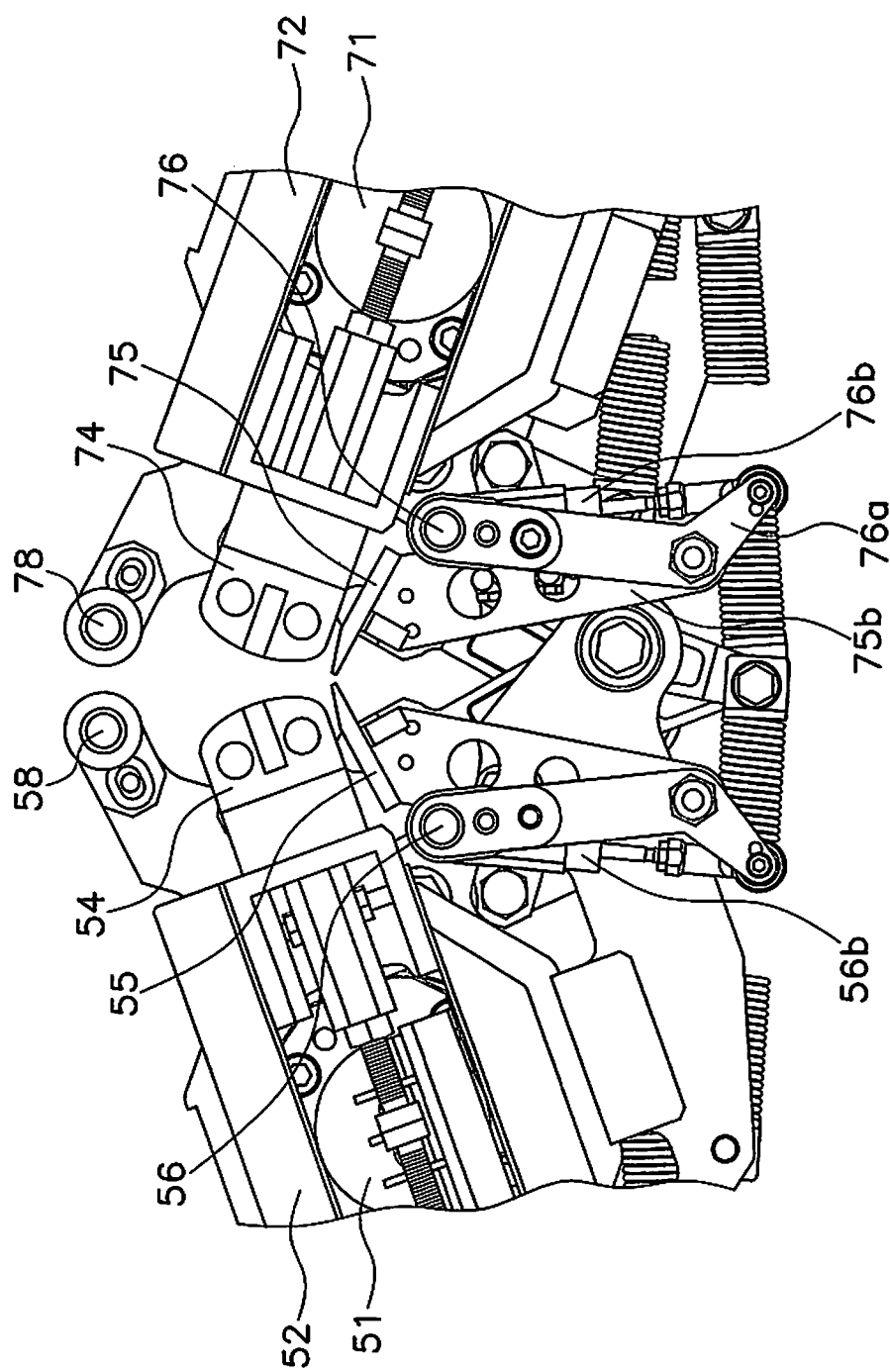
FIG. 6 is a view showing a gas removal member at a first position.
Figure 7:
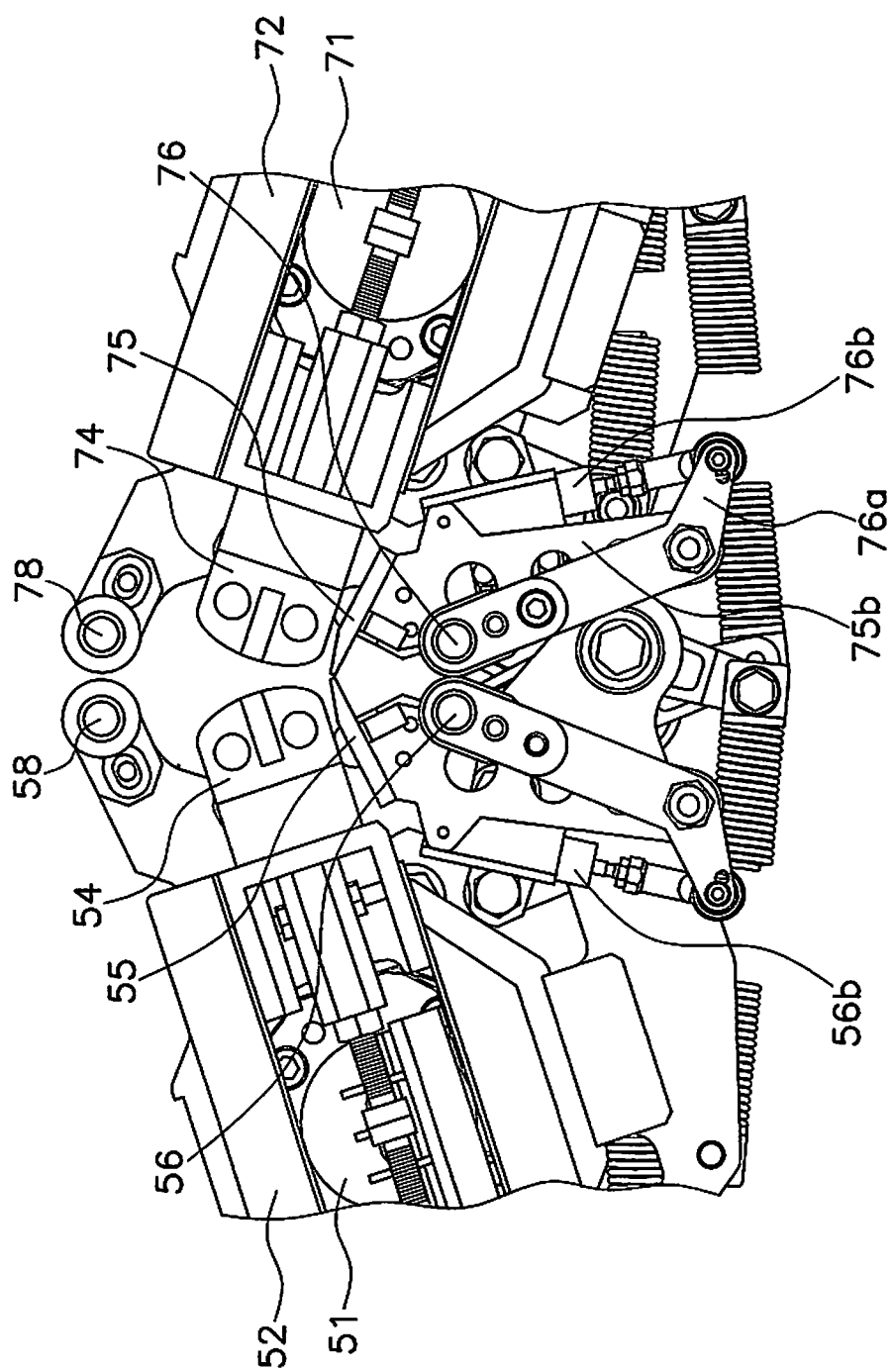
FIG. 7 is a view showing a gas removal member at a second position.

The gas removal members 56, 76 move relatively with respect to the squeezing members 55, 75, at a point in time just prior to transverse sealing of the cylindrical film Fc by the seal jaws 54, 74. In specific terms, the control unit of the form-fill-seal machine 1 can switch the positions of the gas removal members 56, 76 between a first position and a second position. FIGS. 6 and 7 are side views of the transverse sealing mechanism 17 viewed from the right side, as in FIG. 3. FIGS. 6 and 7 represents a state just prior to transverse sealing of the cylindrical film Fc by the seal jaws 54, 74. FIG. 6 represents a state in which the gas removal members 56, 76 are at the first position. FIG. 7 represents a state in which the gas removal members 56, 76 are at the second position. The left-side gas removal member 56 at the first position is positioned further towards the left side than the left-side squeezing member 55. The gas removal member 76 at the second position is positioned further towards the right side than the right-side squeezing member 75. That is, the spacing of the pair of gas removal members 56, 76 at the first position is larger than the spacing of the pair of gas removal members 56, 76 at the second position. As stated above, the positions of the gas removal members 56, 76 are changed by adjusting the air pressure of the air cylinders 56*b*, 76*b*. Specifically, the air cylinders 56*b*, 76*b* are mechanisms for moving the gas removal members 56, 76.

By being moved from the first position to the second position at a point in time just prior to transverse sealing of the cylindrical film Fc by the seal jaws 54, 74, the gas removal members 56, 76 contact the cylindrical film Fc before the seal jaws 54, 74 do. In so doing, air inside the cylindrical film Fc is pushed out and discharged.

(2-4-6) Clamp Rollers

The clamp rollers 58, 78 are arranged extending in a direction perpendicular to the plane of the drawing in FIG. 3. The clamp rollers 58, 78 are arranged to the back of the seal jaws 54, 74, in the direction of rotation of the rotating shafts 51, 71 shown by the dot-and-dash line arrows in FIG. 3. The clamp rollers 58, 78 are rotatably supported by the arm members 52, 72, respectively.

At a point in time just prior to transverse sealing of the cylindrical film Fc by the seal jaws 54, 74, the clamp rollers 58, 78 contact the cylindrical film Fc before the seal jaws 54, 74 do, and with a slight gap left open inside the cylindrical film Fc, clamp the cylindrical film Fc therebetween. In this state, the package contents C supplied from the combination weighing unit 2 are charged into the cylindrical film Fc above the section being clamped between the clamp rollers 58, 78. The clamp rollers 58, 78 begin to separate from one another after the air inside the cylindrical film Fc has been pushed out and discharged upwards by the gas removal members 56, 76.

(2-4-7) Rotating Shaft Horizontal Movement Mechanism

Figure 8:
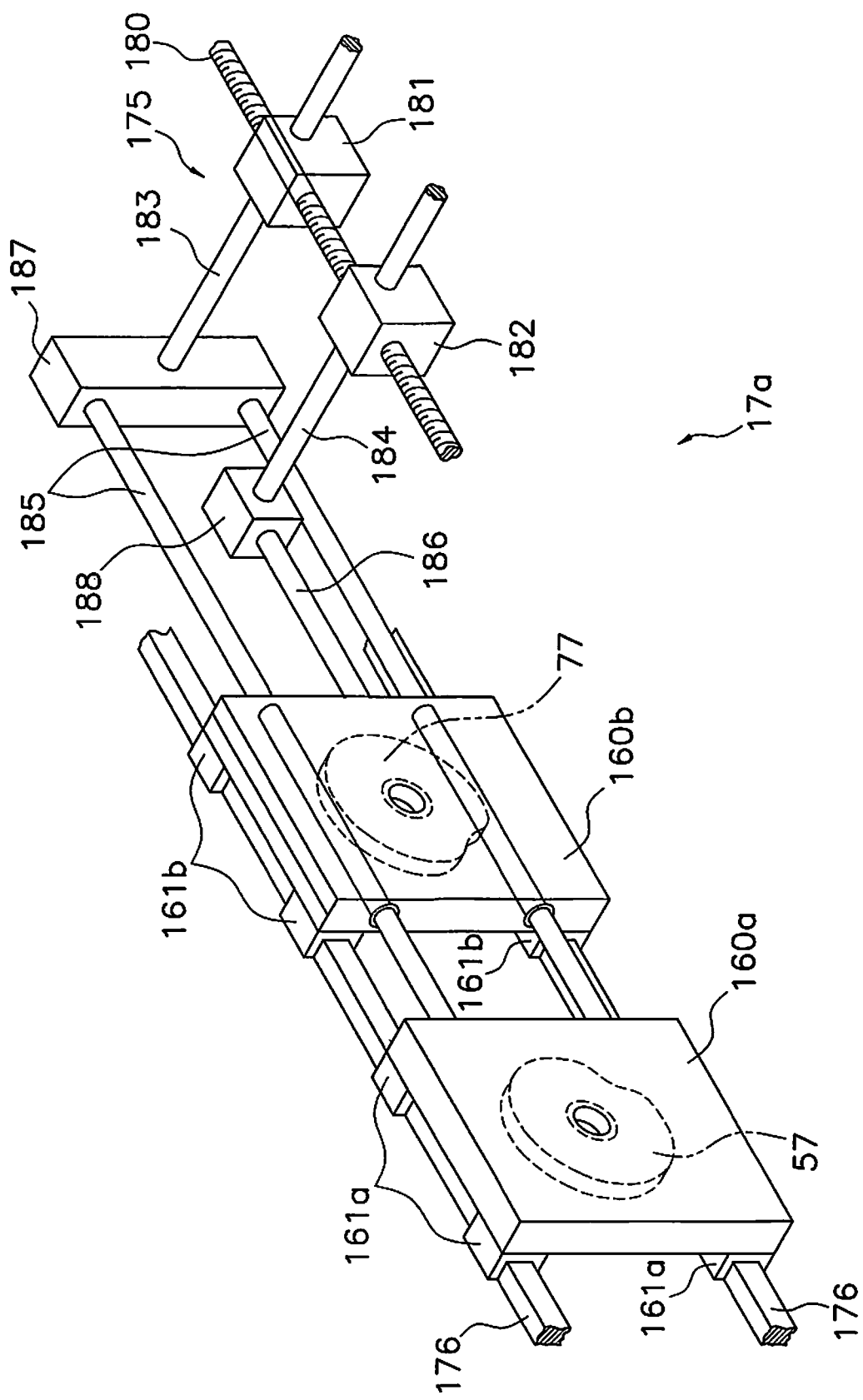
FIG. 8 is a model diagram of a rotating shaft horizontal movement mechanism.

FIG. 8 is a model diagram of the rotating shaft horizontal movement mechanism 17*a*. The rotating shaft horizontal movement mechanism 17*a* mainly includes the pair of cams 57, 77, the pair of moving plates 160*a*, 160*b*, and a drive mechanism 175. The pair of moving plates 160*a*, 160*b*, the linking rods, and the like shown in FIG. 8 are similarly disposed at the opposite side of the drive mechanism 175 as well.

The cams 57, 77 are roughly disk-shaped members. The cams 57, 77 are respectively affixed inside the moving plates 160*a*, 160*b*.

The moving plates 160*a*, 160*b* are rectangular-shaped members. The rotating shafts 51, 71 are rotatably supported at center portions of the respective moving plates 160*a*, 160*b*. Guide parts 161*a*, 161*b* are provided respectively at upper end parts and lower end parts of outside surfaces of the moving plates 160*a*, 160*b*. The guide parts 161*a*, 161*b* are slidably engaged by guide rails 176 disposed on a support frame (not illustrated) of the form-fill-seal machine 1.

The drive mechanism 175 is a mechanism for moving the pair of moving plates 160*a*, 160*b* closer together or further apart. The drive mechanism 175 mainly includes a ball screw 180, a first nut member 181, a second nut member 182, a first linking rod 183, a second linking rod 184, a pair of third linking rods 185, 185, and a fourth linking rod 186. The ball screw 180 is rotated by a motor (not illustrated). The first and second nut members 181, 182 threadably engage the ball screw 180. Through the agency of the first and second nut members 181, 182, the first and second linking rods 183, 184 are respectively disposed to be orthogonal in a horizontal direction, with respect to the ball screw 180. The pair of third linking rods 185, 185 are disposed in the movement direction of the moving plates 160. The fourth linking rod 186 is disposed parallel to the third linking rods 185, 185.

The first linking rod 183 is linked to the pair of third linking rods 185, 185 via a coupling 187. The pair of third linking rods 185, 185 are affixed at their distal ends to a side edge surface of one of the moving plates 160*a*. The pair of third linking rods 185, 185 slidably pass through the other moving plate 160*b*.

The second linking rod 184 is linked to the fourth linking rod 186 via a coupling 188. The fourth linking rod 186 is affixed at its distal end to a side edge surface of the other moving plate 160*b*.

In the ball screw 180, a section that threadably engages the first nut member 181 and a section that threadably engages the second nut member 182 are threaded in mutually opposite directions. By rotating the ball screw 180, it is possible for the pair of moving plates 160*a*, 160*b* to move closer together or further apart. In so doing, the rotating shaft horizontal movement mechanism 17*a* can move the rotating shafts 51, 71 and the cams 57, 77 in a direction orthogonal to the lengthwise direction of the rotating shafts 51, 71. For example, the rotating shaft horizontal movement mechanism 17*a* can move the pair of rotating shafts 51, 71 closer to one another, for transverse sealing of the cylindrical film Fc by the pair of seal jaws 54, 74.

(2-4-8) Additional

While omitted from FIGS. 3, 4, 6, and 7, an additional pair of seal jaws 54, 74, pair of squeezing members 55, 75, pair of gas removal members 56, 76, and pair of clamp rollers 58, 78 are similarly attached to the opposite side in the lengthwise direction of the arm members 52, 72 as well, not just attached to the one side.

(3) Action of Form-Fill-Seal Machine (3-1) Overall Action

First, the action by which the form-fill-seal machine 1 fills the bags B with the package contents C will be described. The film F supplied from the film supply unit 4 to the shaping mechanism 13 is wound about the tube 13*a* and shaped into a cylinder, and is then conveyed downward by the pull-down belt mechanism 14. The two vertical direction-extending edge portions of the film F wound about the tube 13*a* overlap. The overlapping portions of the cylindrically shaped film F are sealed in the longitudinal direction by the longitudinal sealing mechanism 15, forming the cylindrical film Fc.

The longitudinally sealed cylindrical film Fc is removed from the tube 13*a*, and conveyed to the transverse sealing mechanism 17. At the same time that the cylindrical film Fc is conveyed, the package contents C weighed by the combination weighing unit 2 drop down into the tube 13*a*, and the package contents C are charged into the cylindrical film Fc above the section clamped between the clamp rollers 58, 78. At this time, the cylindrical film Fc that was just previously transverse-sealed by the transverse sealing mechanism 17 is present below the section clamped between the clamp rollers 58, 78. Once transverse sealing of the cylindrical film Fc by the transverse sealing mechanism 17 is complete, a bag B having an internal space within which the package contents C are sealed. At this time, the bag B is still linked to the trailing cylindrical film Fc.

FIGS. 9-13 are model diagrams illustrating the transverse sealing action performed by the transverse sealing mechanism 17. The transverse sealing mechanism 17 performs transverse sealing of the cylindrical film Fc above the package contents C in the order of FIGS. 9, 10, 11, 12, and 13, forming the bags B. As shown in FIGS. 9-13, the pair of seal jaws 54, 74 are rotatably driven, thereby performing transverse sealing of an upper edge portion of the bag B and a lower edge portion of the trailing bag at substantially the same time. Then, simultaneously with completion of the transverse sealing action, a cutter (not illustrated) housed in either of the seal jaws 54, 74 cuts the transverse-sealed section of the cylindrical film Fc in the transverse direction. In so doing, the bag B in which the package contents C are sealed is cut away from the trailing cylindrical film Fc.

In this way, the bags B in which the package contents C are sealed are manufactured continuously. The manufactured bags B are then guided to a belt conveyor (not illustrated), and transferred to devices for subsequent steps, such as a thickness checker, a weight checker, and the like.

(3-2) Transverse Sealing Mechanism Operation in Detail

Next, the action of the transverse sealing mechanism 17 of the form-fill-seal machine 1 will be described while referring to FIGS. 9-13. In FIGS. 9-13, depiction of certain parts is omitted, for ease of understanding of the functioning of the members.

In the transverse sealing mechanism 17, the rotating shafts 51, 71 rotate due to rotation of a motor (not illustrated). Due to the rotation of the rotating shafts 51, 71, the arm members 52, 72 experience circling motion centered on the rotating shafts 51, 71. Together with the arm members 52, 72, the seal jaws 54, 74, the squeezing members 55, 75, the gas removal members 56, 76, and the clamp rollers 58, 78 also experience circling motion. FIGS. 9-12 depict a state just prior to the transverse sealing of the cylindrical film Fc, in which the seal jaws 54, 74 are not yet contacting the cylindrical film Fc. FIG. 13 depicts a state during subsequent transverse sealing of the cylindrical film Fc, in which the cylindrical film Fc is clamped between the seal jaws 54, 74. Next, each of the states shown in FIGS. 9-13 will be described.

Figure 9:
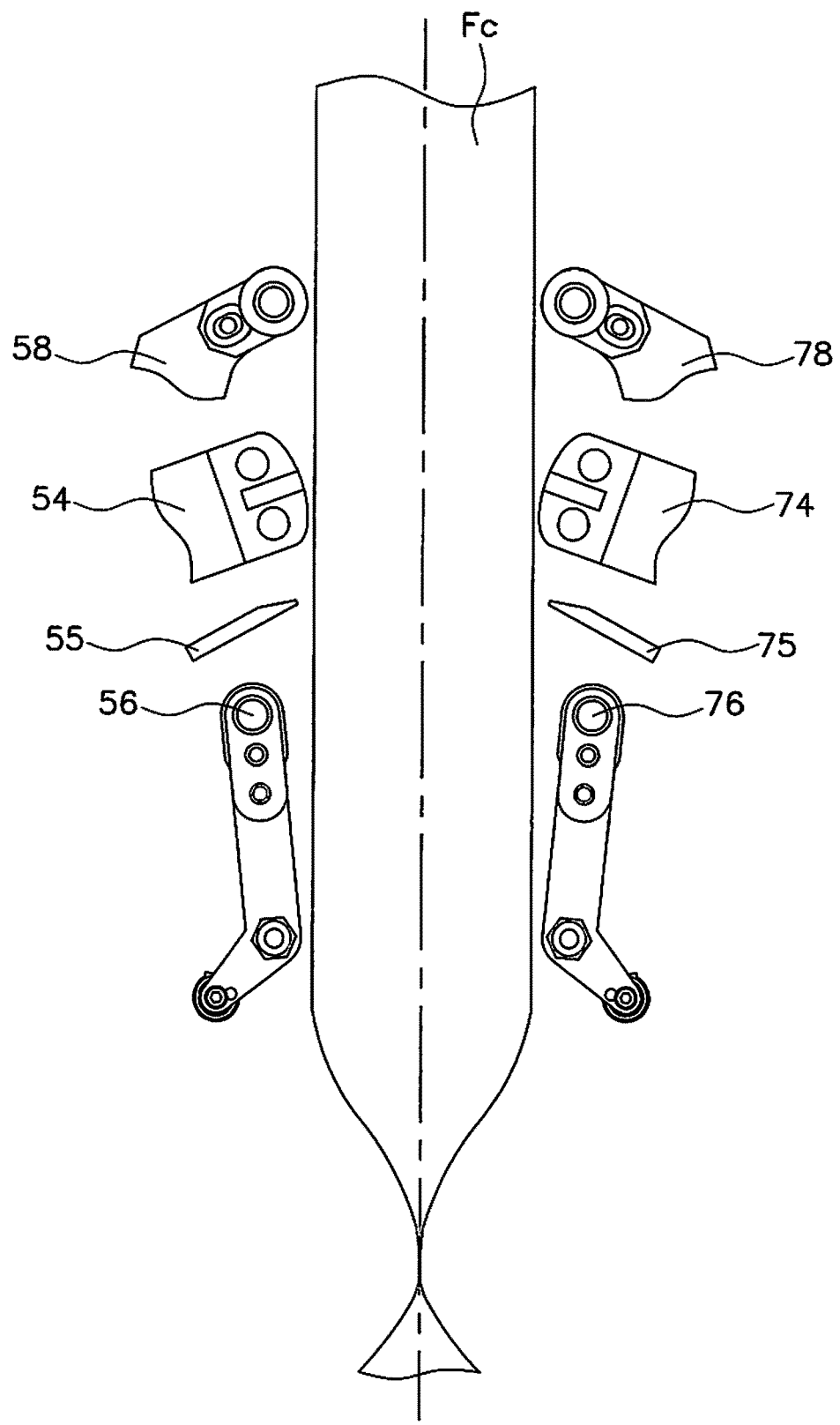
FIG. 9 is a model diagram describing a transverse sealing action by the transverse sealing mechanism.

FIG. 9 depicts a state just prior to downward squeezing of the cylindrical film Fc by the squeezing members 55, 75. In this state, the squeezing members 55, 75 are separated from one another, and the sealing surfaces 54a, 74a of the seal jaws 54, 74 are separated from one another as well. The clamp rollers 58, 78 are also separated from one another. The gas removal members 56, 76 are at the first position.

Figure 10:
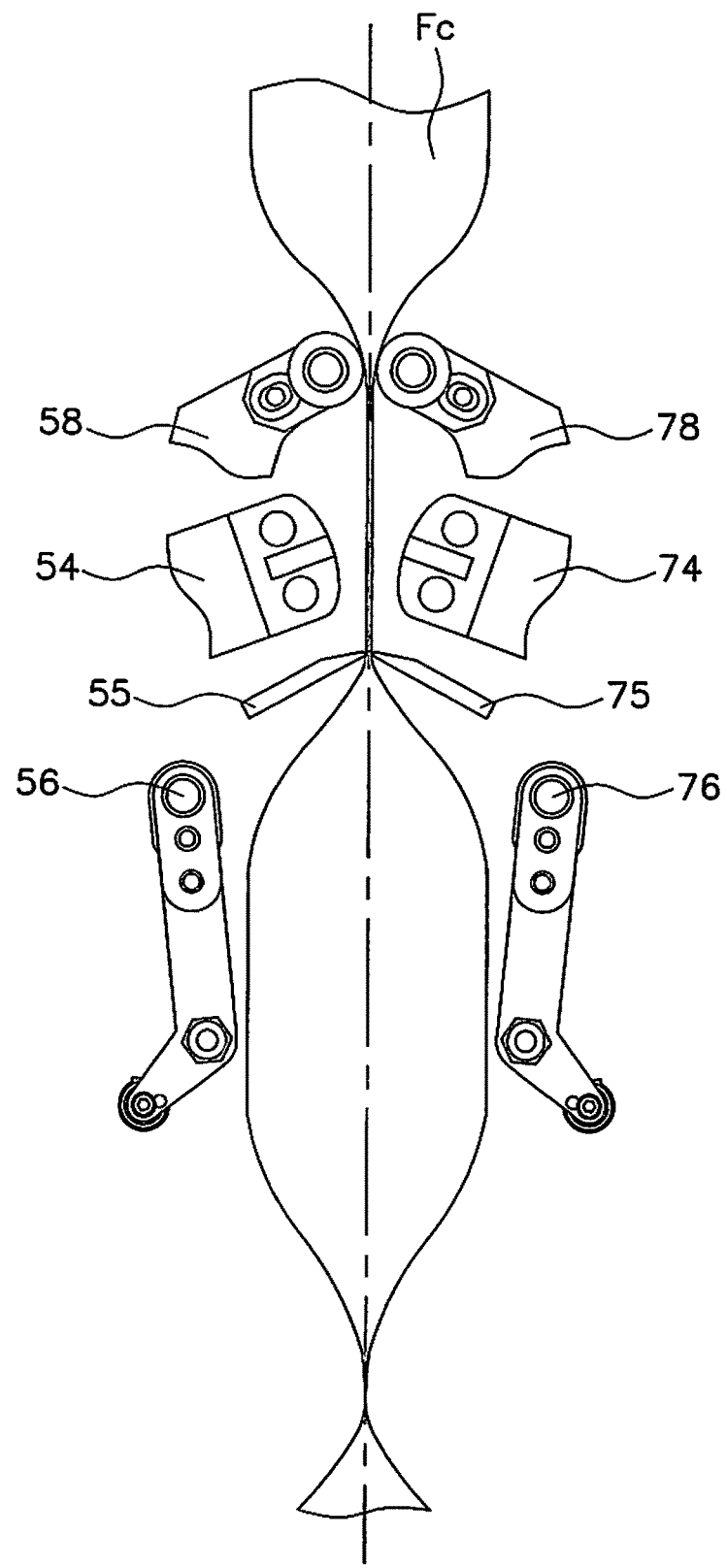
FIG. 10 is a model diagram describing a transverse sealing action by the transverse sealing mechanism.

Next, FIG. 10 depicts a state in which the arm members 52, 72 have circled from the state shown in FIG. 9, and the squeezing members 55, 75 are beginning to squeeze the cylindrical film Fc downward. In this state, the sealing surfaces 54a, 74a of the seal jaws 54, 74 are separated from one another. The clamp rollers 58, 78 are near each other, and in this state, the package contents C weighed by the combination weighing unit 2 are supplied from above. Subsequently, the clamp rollers 58, 78 remain in a state near one another until the cylindrical film Fc has been transverse-sealed, and the bag B in which the package contents C are sealed has been cut away from the cylindrical film Fc. The gas removal members 56, 76 are at the first position. In this state, the gap between the gas removal members 56, 76 at the first position is larger than the thickness of the cylindrical film Fc.

Figure 11:
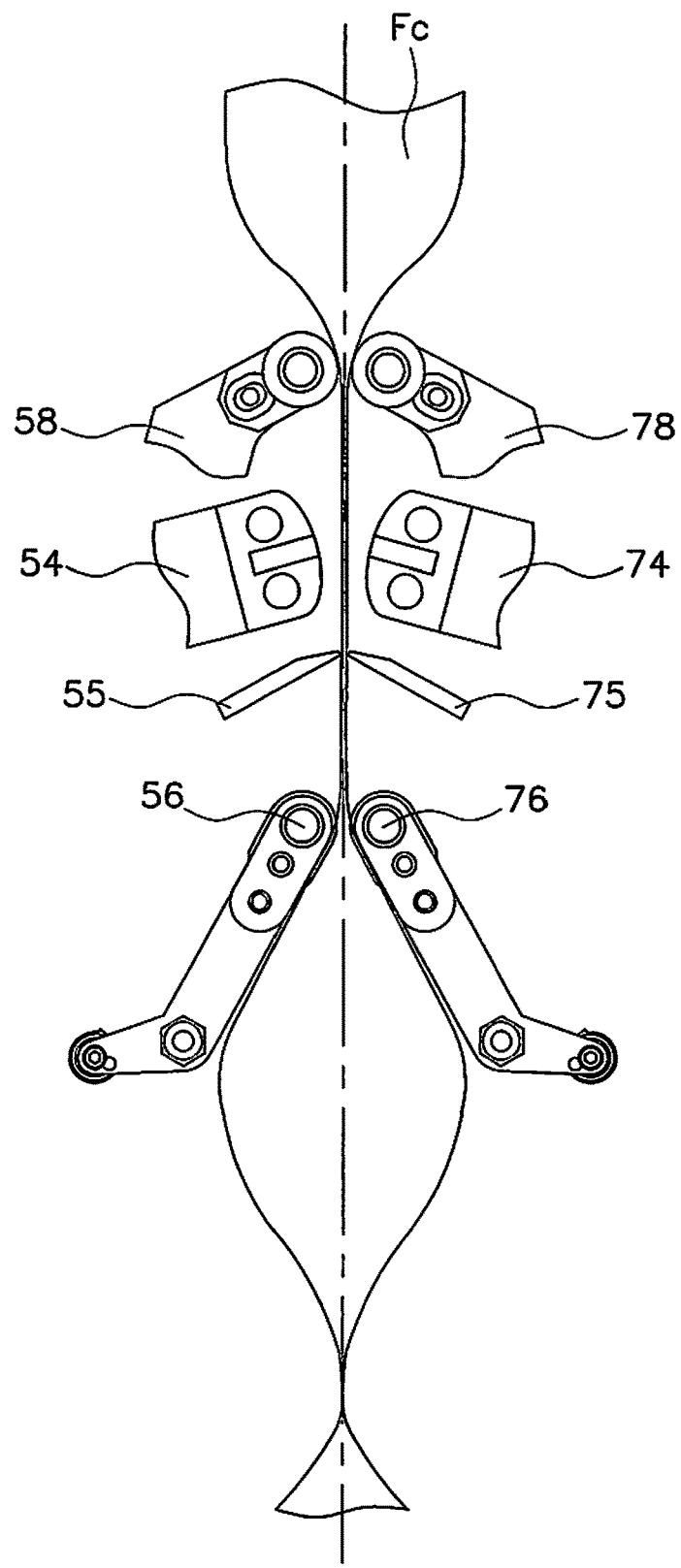
FIG. 11 is a model diagram describing a transverse sealing action by the transverse sealing mechanism.

Next, FIG. 11 depicts a state in which the arm members 52, 72 have circled further from the state shown in FIG. 10, and the squeezing members 55, 75 are squeezing the cylindrical film Fc downward. In this state, in order to squeeze the section of the cylindrical film Fc that is going to be transverse-sealed, and force the descent of the package contents C present inside the cylindrical film Fc, the pair of squeezing members 55, 75 clamp the cylindrical film Fc, while leaving a prescribed gap. At this time, distal end portions of the squeezing members 55, 75 squeeze the cylindrical film Fc downward at a speed greater than the speed at which the cylindrical film Fc is conveyed.

In the state shown in FIG. 11, due to the squeezing action of the squeezing members 55, 75, air flows from above into the space below the section being squeezed by the squeezing members 55, 75. However, while the squeezing members 55, 75 are squeezing the cylindrical film Fc, the control unit switches the position of the gas removal members 56, 76 from the first position to the second position. The gap between the gas removal members 56, 76 when at the second position is smaller than the thickness of the cylindrical film Fc shown in FIG. 10. Therefore, by switching the position of the gas removal members 56, 76, the gas removal members 56, 76 are moved closer to one another, causing the gas removal members 56, 76 to contact the cylindrical film Fc and thereby clamp the cylindrical film Fc from both the front and rear sides. In so doing, air inside the cylindrical film Fc is pushed out upwardly by the gas removal members 56, 76, and is discharged through the gap between the pair of squeezing members 55, 75. Consequently, by switching the position of the gas removal members 56, 76 from the first position to the second position, the cylindrical film Fc is reduced in thickness. As a result, situations in which the cylindrical film Fc is transverse-sealed in a state in which a large quantity of air is present inside the cylindrical film Fc, causing the cylindrical film Fc to expand, are avoided.

Figure 12:
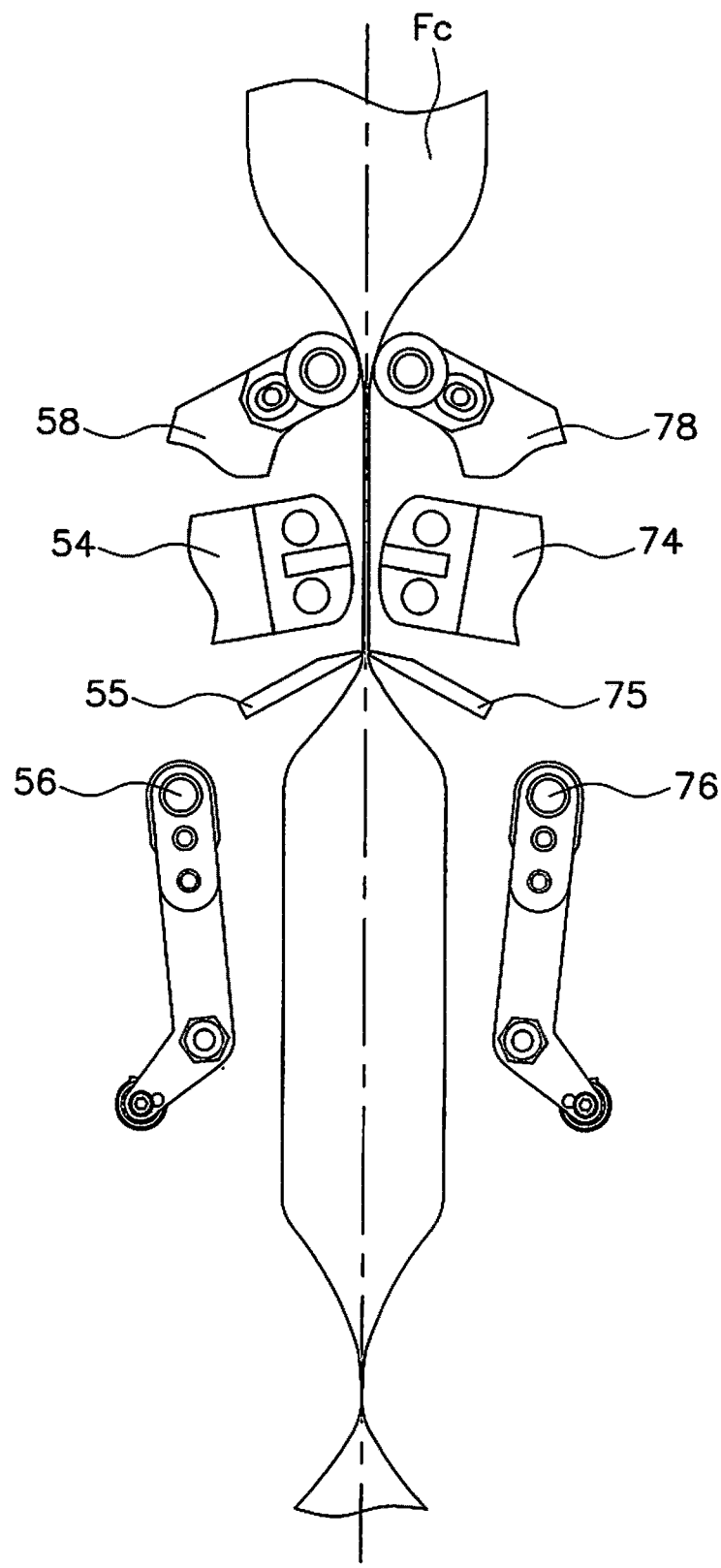
FIG. 12 is a model diagram describing a transverse sealing action by the transverse sealing mechanism.
Figure 13:
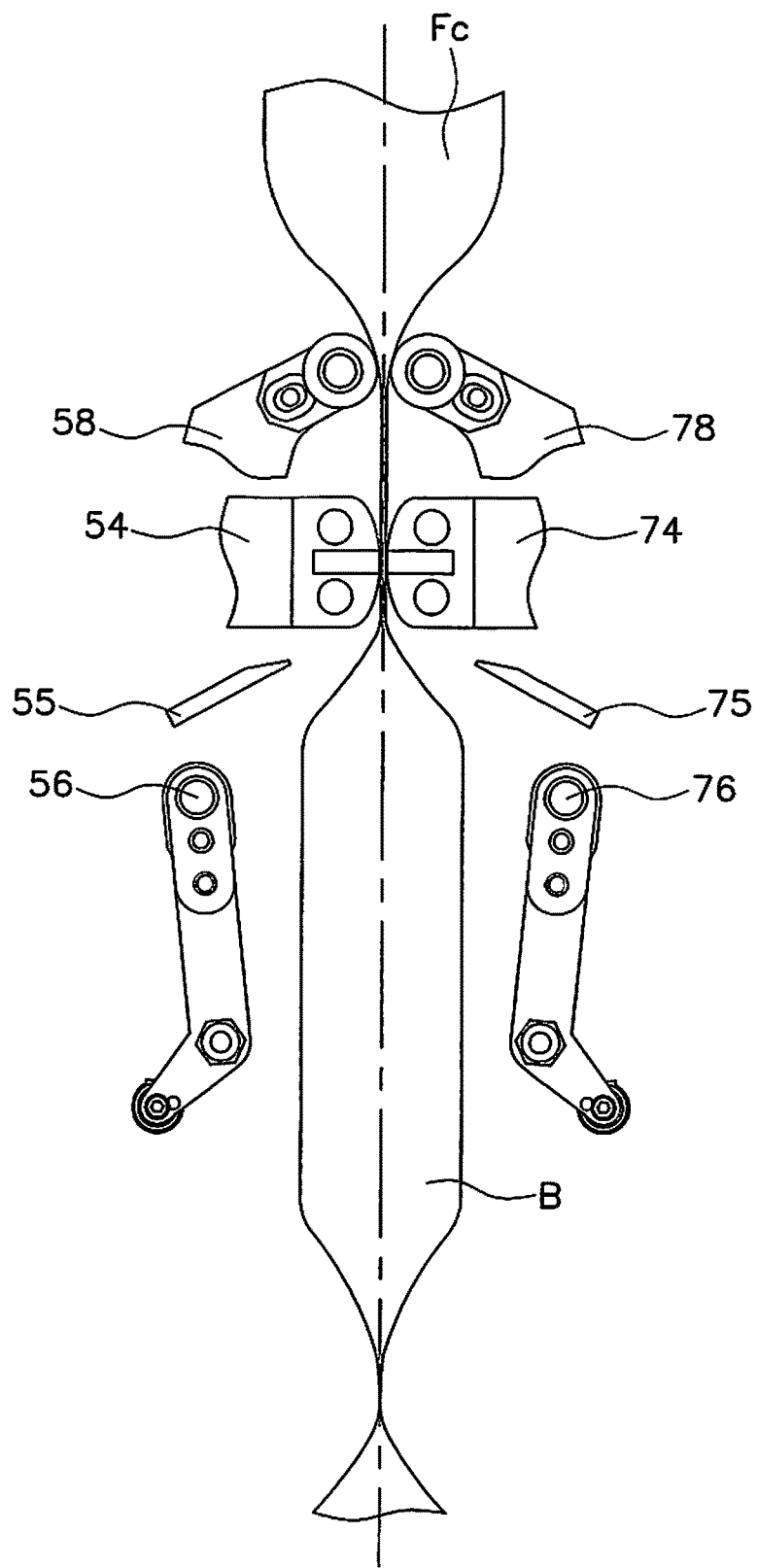
FIG. 13 is a model diagram describing a transverse sealing action by the transverse sealing mechanism.

Next, FIG. 12 depicts a state in which the arm members 52, 72 have circled further from the state shown in FIG. 10, and the squeezing members 55, 75 are further squeezing the cylindrical film Fc downward. Prior to this state, the control unit has switched the position of the gas removal members 56, 76 from the second position to the first position. Therefore, the gas removal members 56, 76 are at the first position. By switching the position of the gas removal members 56, 76, a state in which the cylindrical film Fc is not being clamped between the gas removal members 56, 76 is assumed, and therefore upward discharge of gas inside the cylindrical film Fc ceases. Consequently, by switching the position of the gas removal members 56, 76 from the second position to the first position, situations in which the thickness of the cylindrical film Fc is reduced more than necessary are avoided.

Next, FIG. 13 depicts a state after the arm members 52, 72 have circled further from the state shown in FIG. 10, the squeezing members 55, 75 have finished squeezing the cylindrical film Fc, and the seal jaws 54, 74 are clamping the cylindrical film Fc and transverse-sealing it. Just prior to the state shown in FIG. 13, the rotating shaft horizontal movement mechanism 17a moves the pair of rotating shafts 51, 71 closer towards one another. In so doing, the sealing surfaces 54a, 74a of the seal jaws 54, 74 reliably clamp the cylindrical film Fc. Additionally, by adjusting the motor output of the rotating shaft horizontal movement mechanism 17a, prescribed heat and pressure are applied to the cylindrical film Fc by the seal jaws 54, 74, to bring about transverse sealing of the cylindrical film Fc. In so doing, below the section transverse-sealed by the seal jaws 54, 74, there is formed a bag B which has in its interior a space in which the package contents C are present, and which remains linked to the trailing cylindrical film Fc. Thereafter, the transverse-sealed section of the cylindrical film Fc is cut in the transverse direction, and the bag B is cut away from the trailing cylindrical film Fc.

FIG. 14 is a graph showing the timing for switching the position of the gas removal members 56, 76 during the transverse sealing action performed by the transverse sealing mechanism 17 shown in FIGS. 9-13. The graph at the top in FIG. 14 represents the state of the squeezing members 55, 75, and the graph at the bottom in FIG. 14 represents the state of the gas removal members 56, 76. In both graphs of FIG. 14, the horizontal axis represents time, and the vertical axis indicates state. The squeezing members 55, 75 are in either a first state or a second state. In the first state, the pair of squeezing members 55, 75 are separated as shown in FIG. 9, and do not squeeze the cylindrical film Fc. In the second state, the pair of squeezing members 55, 75 are close to one another with a slight gap between them, as shown in FIGS. 10-12, and downwardly squeeze the cylindrical film Fc. As mentioned above, the gas removal members 56, 76 are at either the first position or the second position. Next, the timing for switching the states of the squeezing members 55, 75 and the gas removal members 56, 76 will be described while referring to FIG. 14.

The squeezing members 55, 75 begin to transition from the first state to the second state at time t11, and enter the second state at time t12. Thereafter, the squeezing members 55, 75 begin to transition from the second state to the first state at time t13, and enter the first state at time t14. During the period from time t12 to time t13, the squeezing members 55, 75 downwardly squeeze the cylindrical film Fc. At time t13, the seal jaws 54, 74 commence transverse sealing of the cylindrical film Fc. Specifically, after the squeezing members 55, 75 have finished squeezing the cylindrical film Fc, the cylindrical film Fc is clamped between the seal jaws 54, 74, and transverse-sealed.

At time t21, the gas removal members 56, 76 begin to transition from the first position to the second position, and reach the second position at time t22. Thereafter, at time t23 the gas removal members 56, 76 begin to transition from the second position to the first position, and reach the first position at time t24. During the period from time t22 to time t23, the cylindrical film Fc is clamped between the pair of gas removal members 56, 76, and gas inside the cylindrical film Fc is pushed upward and discharged.

After transverse sealing of the cylindrical film Fc has commenced at time t13, air inside the cylindrical film Fc can no longer be discharged by the gas removal members 56, 76. For this reason, it is necessary for the time t24, at which the gas removal members 56, 76 transition to the first position and discharge of gas from the cylindrical film Fc is completely finished, to precede the time t13 at which transverse sealing of the cylindrical film Fc commences.

(4) Characteristics of Form-Fill-Seal Machine (4-1)

The transverse sealing mechanism 17 of the form-fill-seal machine 1 of the present embodiment is provided with the pair of gas removal members 56, 76. During the interval that the arm members 52, 72 are rotated centered on the rotating shafts 51, 71, the pair of gas removal members 56, 76 come into contact with the cylindrical film Fc from both the front and rear sides, and clamp the cylindrical film Fc for a prescribed period. Thereafter, the pair of gas removal members 56, 76 separate from the cylindrical film Fc, and the pair of seal jaws 54, 74 clamp and transverse-seal the cylindrical film Fc.

It is conceivable that a state in which a large amount of air is present inside the cylindrical film could exist just prior to transverse sealing of the cylindrical film. If the cylindrical film were transverse-sealed in such a state, the thickness of the transverse-sealed bags made therefrom might be greater than necessary. Once the package contents have been sealed therein, the bags are boxed and shipped. However, if the amount of gas sealed within the bags is too great, given numbers of bags cannot be accommodated within the boxes.

Accordingly, in the present embodiment, prior to transverse sealing of the cylindrical film Fc by the pair of seal jaws 54, 74, the cylindrical film Fc is clamped for a prescribed period between the pair of gas removal members 56, 76, and a prescribed amount of the gas inside the cylindrical film Fc is discharged. Thereafter, the cylindrical film Fc is clamped between the pair of seal jaws 54, 74 and transverse-sealed. In so doing, some of the air present inside the cylindrical film Fc prior to transverse sealing can be discharged, whereby situations in which excess air is sealed in the completed, transverse-sealed bags B are avoided. Specifically, the gas removal members 56, 76 have the function of minimizing instances in which the completed bags B expand more than necessary.

Consequently, the form-fill-seal machine 1 is able to adjust the thickness of the completed bags B by clamping the cylindrical film Fc between the pair of gas removal members 56, 76 prior to transverse sealing. For example, the form-fill-seal machine 1 can maintain constant thickness of the completed bags B by establishing a fixed duration for the pair of gas removal members 56, 76 to clamp the cylindrical film Fc prior to transverse sealing.

(4-2)

The control unit of the form-fill-seal machine 1 of the present embodiment, by employing actuators having the air cylinders 56b, 76b as power supplies, can switch the position of the gas removal members 56, 76 between the first position and the second position. By controlling the air pressure of the air cylinders 56b, 76b, the control unit can switch the position of the gas removal members 56, 76. For this reason, the form-fill-seal machine 1, via the control unit, can control with high accuracy the timing for switching the position of the gas removal members 56, 76.

The duration for which the cylindrical film Fc is clamped between the pair of gas removal members 56, 76 prior to transverse sealing affects the thickness of the completed bags B. For this reason, by having the control unit control the timing for switching the position of the gas removal members 56, 76, the amount of gas discharged from inside the cylindrical film Fc just prior to transverse sealing can be adjusted with high accuracy. Consequently, the form-fill-seal machine 1 can adjust the thickness of the completed bags B with high accuracy.

(4-3)

Using the actuators for which the air cylinders 56b, 76b are the power supply, the control unit of the form-fill-seal machine 1 of the present embodiment can switch the position of the gas removal members 56, 76 between the first position and the second position. Through control of the timing of switching the position of the gas removal members 56, 76 by the control unit, the form-fill-seal machine 1 can adjust the thickness of the completed bags B.

The operator of the form-fill-seal machine 1 can set the timing of switching the position of the gas removal members 56, 76 through input operation from the operation switch 5 and the liquid crystal display 6. For this reason, it is unnecessary for the operator of the form-fill-seal machine 1 to adjust, inter alia, the position of the gas removal members 56, 76 according to the desired thickness of the bags B, prior to packing of the package contents C by the form-fill-seal machine 1. Consequently, the form-fill-seal machine 1 can easily adjust the thickness of the completed bags B within a short time.

(4-4)

The transverse sealing mechanism 17 of the form-fill-seal machine 1 of the present embodiment is provided with the pair of squeezing members 55, 75. The squeezing members 55, 75 can forcibly induce descent of the package contents C inside the cylindrical film Fc. For this reason, it is possible to avoid situations, when using the form-fill-seal machine 1, in which foreign matter such as the package contents C becomes enmeshed in the seal jaws 54, 74 in the transverse-sealed section of the cylindrical film Fc. Consequently, the form-fill-seal machine 1 can minimize the occurrence of seal defects by the seal jaws 54, 74.

The pair of squeezing members 55, 75 squeeze the cylindrical film Fc downward, while leaving a slight gap inside the cylindrical film Fc. For this reason, even while the cylindrical film Fc is being squeezed by the squeezing members 55, 75, air inside the cylindrical film Fc is discharged through the gap between the squeezing members 55, 75, by being pushed out upward by the gas removal members 56, 76.

(5) Modifications

While the present invention has been described above in terms of one preferred embodiment, the present invention is not limited to this embodiment; various modifications are possible without departing from the spirit of the invention.

(5-1) Modification A

In the present embodiment, the control unit of the form-fill-seal machine 1 can control the timing of switching the position of the gas removal members 56, 76. In FIG. 14, the time t24 at which the gas removal members 56, 76 transition to the first position may be any time prior to commencement of transverse sealing of the cylindrical film Fc at time t13. By controlling the timing of switching the position of the gas removal members 56, 76, the form-fill-seal machine 1 can adjust the thickness of the completed bags B. For example, a longer period for which the gas removal members 56, 76 are at the second position is (in FIG. 14, the period from time t22 to time t23) corresponds to a smaller thickness of the completed bags B.

Figure 15:
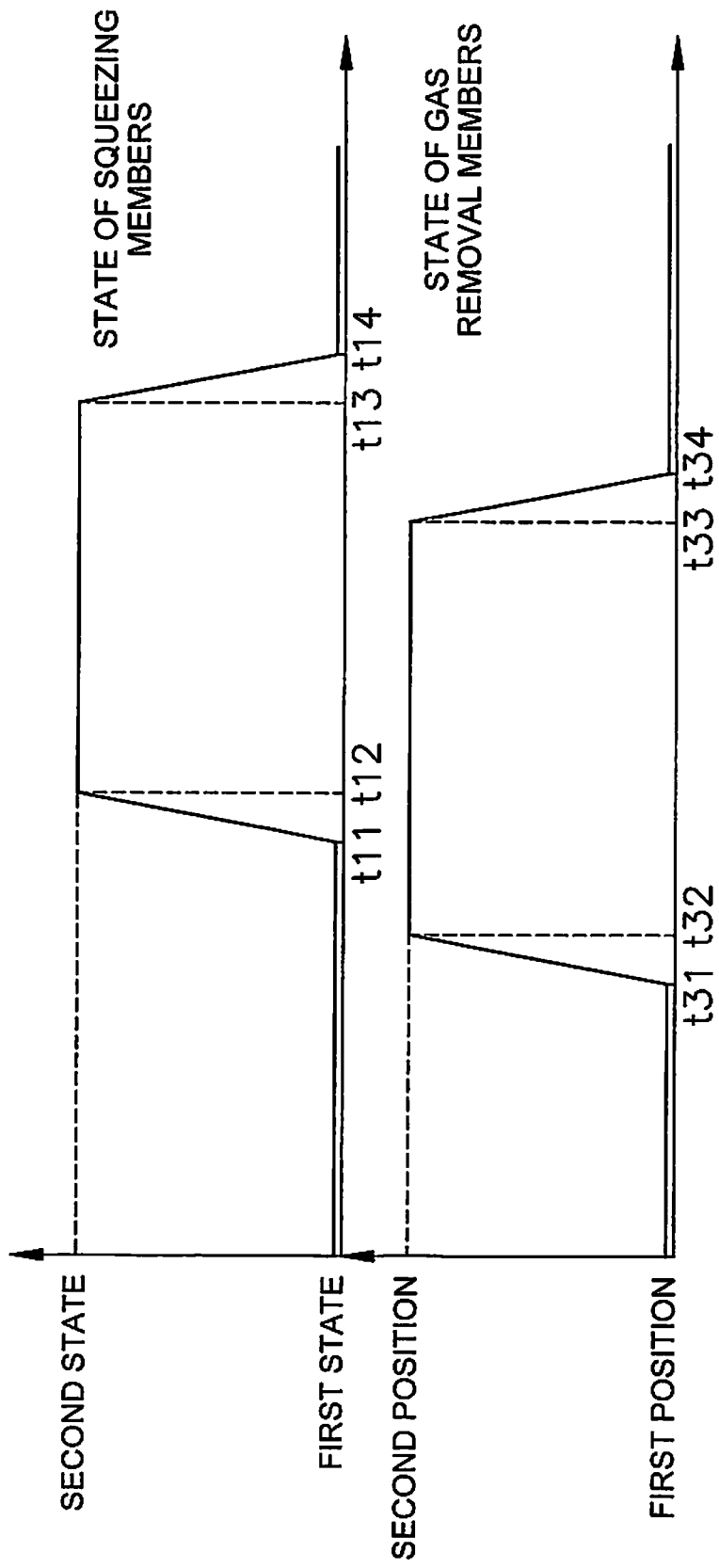
FIG. 15 is an example of graphs of timing of switching of the position of a gas removal member in a Modification A.

FIGS. 15 and 16 are graphs showing examples of the timing of switching the position of the gas removal members 56, 76 in the present modification. FIGS. 15 and 16 are graphs of the same type as FIG. 14 according to the present embodiment. Times t31-t34 shown in FIG. 15 respectively correspond to times t21-t24 shown in FIG. 14. Times t11-t14 shown in FIGS. 15 and 16 are respectively the same as times t11-t14 shown in FIG. 14. In FIGS. 15 and 16, the time at which transverse sealing of the cylindrical film Fc commences is time t13, as in the present embodiment.

In the pattern of switching timing shown in FIG. 15, the period t32-t33 for which the gas removal members 56, 76 are at the second position is longer than the period t22-t23 shown in FIG. 14. In FIG. 15, the times t31, t32 precede the time t12 at which the squeezing members 55, 75 start to squeeze the cylindrical film Fc downward. In FIG. 15, the time t34 at which the gas removal members 56, 76 transition of the first position is the same as the time t24 shown in FIG. 14 according to the present embodiment. Consequently, in the pattern of FIG. 15, due to the longer period t32-t33 for which the gas removal members 56, 76 are at the second position, the thickness of the completed bags B is smaller in comparison with the present embodiment.

In the pattern of switching timing shown in FIG. 16, the gas removal members 56, 76 are always at the first position until the time t13 at which transverse sealing of the cylindrical film Fc commences. For this reason, for the duration that the transverse sealing mechanism 17 is transverse-sealing the cylindrical film Fc, gas inside the cylindrical film Fc is not discharged by the pair of gas removal members 56, 76. Consequently, in the pattern of FIG. 16, since there is no period during which the gas removal members 56, 76 are at the second position, the completed bags B are thicker than in the present embodiment.

As shown in FIG. 15, in the present modification, when the position of the gas removal members 56, 76 is switched from the first position to the second position prior to the time t12 at which the squeezing members 55, 75 start to squeeze the cylindrical film Fc downward, gas inside the cylindrical film Fc is pushed upward through a wide gap between the pair of squeezing members 55, 75, as shown in FIG. 9. For this reason, in the pattern of FIG. 15, gas inside the cylindrical film Fc is easily discharged, and it is easier for the completed bags B to be made less thick.

Meanwhile, as shown in FIG. 14, when the position of the gas removal members 56, 76 is switched from the first position to the second position subsequent to the time t12 at which the squeezing members 55, 75 start to squeeze the cylindrical film Fc downward, gas inside the cylindrical film Fc is pushed upward through a narrow gap between the pair of squeezing members 55, 75 which are clamping the cylindrical film Fc. For this reason, in the pattern of FIG. 14, it is difficult for the gas inside the cylindrical film Fc to be discharged. Consequently, by making fine adjustments to the duration of the period for which the gas removal members 56, 76 are at the second position subsequent to the time t12, the form-fill-seal machine 1 can control with high accuracy the amount of gas discharged from inside the cylindrical film Fc.

(5-2) Modification B

In the present embodiment, the control unit of the form-fill-seal machine 1 switches the position of the gas removal members 56, 76 between the first position and the second position. However, it would be acceptable for the control unit to switch the position of the gas removal members 56, 76 to a position other than the first position and the second position. For example, a third position may be defined at a position between the first position and the second position, and the control unit may switch the position of the gas removal members 56, 76 between the first position and the third position. In this case, the gas removal members 56, 76 at the third position would be positioned between the gas removal members 56, 76 at the first position and the gas removal members 56, 76 at the second position, respectively.

Through appropriate adjustment of the air pressure of the air cylinder 56a, the control unit of the form-fill-seal machine 1 can switch the position of the gas removal members 56, 76 to any position besides the first position and the second position. Consequently, by controlling the air pressure of the air cylinder 56a, the control unit can adjust the amount of gas discharged from the interior of the cylindrical film Fc by the pair of gas removal members 56, 76, and adjust the thickness of the completed bags B.

(5-3) Modification C

In the present embodiment, the transverse sealing mechanism 17 of the form-fill-seal machine 1 is provided with the squeezing members 55, 75, but it would be acceptable to not provide the squeezing members 55, 75. In this case, as in the present embodiment, the time at which the gas removal members 56, 76 are finished transitioning from the second position to the first position, and discharge of the gas from the inside of the cylindrical film Fc is fully terminated, must precede the time at which transverse sealing of the cylindrical film Fc commences.

(5-4) Modification D

In the present embodiment, the form-fill-seal machine 1 may be further provided with a gas infusion mechanism 16. The gas infusion mechanism 16 is a mechanism for infusing the interior of the cylindrical film Fc with a gas, just prior to transverse sealing by the transverse sealing mechanism 17. It would be acceptable for the gas infusion mechanism 16 to be, e.g., a member that can induce air to flow into the interior of the tube 13a of the shaping mechanism 13 towards the bottom from the top. By infusing the interior of the cylindrical film Fc with air just prior to transverse sealing of the cylindrical film Fc, the gas infusion mechanism 16 can increase amount of air present in the cylindrical film Fc interior, causing the cylindrical film Fc to expand. Consequently, by employing the gas infusion mechanism 16, the form-fill-seal machine 1 can enlarge the thickness of the completed bags B.

(5-5) Modification E

In the present embodiment, the form-fill-seal machine 1 can employ the pair of gas removal members 56, 76 to adjust the thickness of the completed bags B. However, it would be acceptable to connect the form-fill-seal machine 1 to a thickness measurement mechanism for measuring the thickness of the completed bags B. In a form-fill-seal system including the form-fill-seal machine 1 and the thickness measurement mechanism, the thickness of the bags B manufactured by the form-fill-seal machine 1 is measured by the thickness measurement mechanism. The control unit of the form-fill-seal machine 1 adjusts the amount of gas discharged from the cylindrical film Fc just prior to transverse sealing, in accordance with the measured thickness of the bags B.

For example, in cases in which the thickness of the bags B measured by the thickness measurement mechanism is greater than a prescribed value, in order to reduce the thickness of the completed bags B, the control unit of the form-fill-seal machine 1 may automatically carry out control to prolong the period for which the pair of gas removal members 56, 76 are at the second position. Conversely, in cases in which the thickness of the bags B measured by the thickness measurement mechanism is less than a prescribed value, in order to increase the thickness of the completed bags B, the control unit of the form-fill-seal machine 1 may automatically carry out control to shorten the period for which the pair of gas removal members 56, 76 are at the second position.

The invention claimed is:

1. A form-fill-seal machine for filling and hermetically sealing dry contents in a tube-shaped packaging material, the form-fill-seal machine comprising:
    transverse sealing members for transverse-sealing the packaging material in the widthwise direction and forming a bag, the transverse sealing members being configured to move into contact with the packaging material during formation of the bag;
    gas removal members arranged below the transverse sealing members, the gas removal members being moved into contact with the bag just prior to sealing of an upper edge by the transverse sealing members, and discharging a gas upwardly from the bag;
    a movement mechanism for moving the gas removal members, switching the position of the gas removal members between at least a first position and a second position with respect to the transverse sealing members; and
    a control mechanism that, in a time slot just prior to the start of a transverse sealing action performed by the transverse sealing members, changes the timing of switching between the first position and the second position, and adjusts the amount of gas discharged from the bag,
    wherein the control mechanism, at a first switching time, switches the position of the gas removal members from the first position to the second position, increasing the amount of gas discharged from the bag; and, at a second switching time, switches the position of the gas removal members from the second position to the first position, decreasing the amount of gas discharged from the bag; and
    the control mechanism sets the first switching time to precede the second switching time, and sets the second switching time to precede the time at which the transverse sealing action performed by the transverse sealing member commences, the control mechanism being configured to control the amount of gas discharged from the bag by making adjustments to the duration of the period for which the gas removal members are at the second position.

2. The form-fill-seal machine according to claim 1, further comprising squeezing members arranged below the transverse sealing members, the squeezing members coming into contact with the bag just prior to transverse sealing by the transverse sealing members, and squeezing the bag downward.

3. The form-fill-seal machine according to claim 1, further comprising a gas infusion mechanism for infusing the interior of the bag with a gas just prior to transverse sealing by the transverse sealing members.

4. The form-fill-seal machine according to claim 1, wherein the movement mechanism has actuators for adjusting the position of the gas removal members, and air cylinders as power supplies for the actuators, and
    the control mechanism further changes the pressure of the air cylinders, and adjusts the amount of gas discharged from the bag.

5. A form-fill-seal system comprising
    the form-fill-seal machine according to claim 1; and
    a thickness measurement mechanism for measuring the thickness of the bag hermetically sealed through transverse sealing by the transverse sealing members,
    the control mechanism adjusting the amount of gas discharged from the bag, according to the bag thickness measured by the thickness measurement mechanism.

6. The form-fill-seal machine according to claim 1, wherein
    the dry contents filling the bag are food products.

7. A form-fill-seal machine for filling and hermetically sealing dry contents in a tube-shaped packaging material, the form-fill-seal machine comprising:
    transverse sealing members for transverse-sealing the packaging material in the widthwise direction and forming a bag;
    gas removal members arranged below the transverse sealing members, the gas removal members coming into contact with the bag just prior to sealing of an upper edge by the transverse sealing members, and discharging a gas upwardly from the bag;
    a movement mechanism for moving the gas removal members, switching the position of the gas removal members between at least a first position and a second position with respect to the transverse sealing members; and
    a control mechanism that, in a time slot just prior to the start of a transverse sealing action performed by the transverse sealing members, changes the timing of switching between the first position and the second position, and adjusts the amount of gas discharged from the bag, wherein the control mechanism, at a first switching time, switches the position of the gas removal members from the first position to the second position, increasing the amount of gas discharged from the bag; and, at a second switching time, switches the position of the gas removal members from the second position to the first position, decreasing the amount of gas discharged from the bag; and the control mechanism sets the first switching time to precede the second switching time, and sets the second switching time to precede the time at which the transverse sealing action performed by the transverse sealing member commences, the control mechanism being configured to control the amount of gas discharged from the bag by making adjustments to the duration of the period for which the gas removal members are at the second position.

8. The form-fill-seal machine according to claim 7, wherein the transverse sealing members for transverse-sealing are moved into contact with the packaging material during forming of the bag, and the movement mechanism is configured to move the gas removal members into contact with the bag in order to discharge gas upwardly from the bag.

* * * * *